(12) United States Patent
Yoshida

(10) Patent No.: US 10,585,515 B2
(45) Date of Patent: Mar. 10, 2020

(54) DISPLAY DEVICE WITH POSITION INPUTTING FUNCTION

(71) Applicant: Sharp Kabushiki Kaisha, Sakai, Osaka (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 67 days.

(21) Appl. No.: 16/124,229

(22) Filed: Sep. 7, 2018

(65) Prior Publication Data

US 2019/0079620 A1 Mar. 14, 2019

(30) Foreign Application Priority Data

Sep. 13, 2017 (JP) ................. 2017-175602

(51) Int. Cl.
| | |
|---|---|
| G06F 3/041 | (2006.01) |
| G02F 1/1362 | (2006.01) |
| G02F 1/133 | (2006.01) |
| G02F 1/1343 | (2006.01) |
| G02F 1/1368 | (2006.01) |
| G06F 3/044 | (2006.01) |
| G02F 1/136 | (2006.01) |
| G02F 1/1333 | (2006.01) |

(52) U.S. Cl.
CPC .......... *G06F 3/0412* (2013.01); *G02F 1/1368* (2013.01); *G02F 1/13338* (2013.01); *G02F 1/134336* (2013.01); *G02F 1/134363* (2013.01); *G02F 1/136286* (2013.01); *G06F 3/044* (2013.01); *G06F 3/0416* (2013.01); *G02F 2001/13606* (2013.01); *G02F 2001/134372* (2013.01); *G02F 2201/121* (2013.01); *G02F 2201/123* (2013.01); *G06F 2203/04111* (2013.01)

(58) Field of Classification Search
CPC ................. G02F 2201/121; G06F 2203/04111
See application file for complete search history.

(56) References Cited

U.S. PATENT DOCUMENTS

| | | | |
|---|---|---|---|
| 2015/0145812 A1* | 5/2015 | Sun .......................... | G06F 3/044 345/174 |
| 2016/0216802 A1* | 7/2016 | Bao ........................ | G06F 3/0412 |

(Continued)

*Primary Examiner* — Priyank J Shah
(74) *Attorney, Agent, or Firm* — Keating & Bennett, LLP

(57) ABSTRACT

A display device with a position inputting function includes pixel electrodes, signal wiring, position detection electrodes, a position detection wiring, conductive structural objects, bridging wirings, and an insulating film. The signal wirings are disposed to sandwich the pixel electrodes. The position detection wiring includes at least first wiring portions and second wiring portions. The first wiring portions are sandwiched between the pixel electrodes and the signal wirings. Pairs of the first wiring portions are linearly disposed in an arrangement direction in which the pixel electrodes are disposed. The second wiring portions connect ends of the first wiring portions adjacent to each other in the arrangement direction. The bridging wirings are disposed to cross the conductive structural objects. The bridging wirings include sections connected to ends of the first wiring portions adjacent to each other in the arrangement direction on the same side through contact holes in the insulating film.

10 Claims, 16 Drawing Sheets

(56) References Cited

U.S. PATENT DOCUMENTS

2017/0192571 A1\* 7/2017 Kim .................... G02F 1/13338
2019/0079621 A1\* 3/2019 Yoshida ................ G06F 3/0412
2019/0318702 A1\* 10/2019 Yoshida ............ G02F 1/136286

\* cited by examiner

DISPLAY DEVICE WITH POSITION INPUTTING FUNCTION

CROSS REFERENCE TO RELATED APPLICATION

This application claims priority from Japanese Patent Application No. 2017-175602 filed on Sep. 13, 2017. The entire contents of the priority application are incorporated herein by reference.

TECHNICAL FIELD

The technology described herein relates to a display device with a position inputting function.

BACKGROUND

A liquid crystal display device that includes an in-cell touchscreen display includes touch electrodes using a self-capacitive method and a touch wiring connected to the touch electrodes through first via holes. Second via holes are formed in sections of the touch electrodes overlapping the first via holes and the touch wiring to which the touch electrodes are connected. An example of such a liquid crystal display device is disclosed in US patent application publication No. 2016/0216802.

In the liquid crystal display device, the second via holes are provided to reduce leak currents from the touch electrodes to a touch wiring to which the touch electrodes are not connected. The liquid crystal display device includes the pixel electrodes and source wirings through which image signals are supplied to the pixel electrodes. The source wirings are disposed to sandwich the pixel electrodes. The touch wiring is sandwiched between one of the source wirings and the pixel electrodes. According to the configuration, parasitic capacitances between the pixel electrodes and the source wiring are different from parasitic capacitances between the pixel electrodes and the other one of the source wirings because the touch wiring is disposed between the pixel electrodes and the source wiring. If image signals with inverted polarities are supplied to the source wirings during column inverting driving, variations in potential of the pixel electrodes are not compensated based on the parasitic capacitances and variations in potential of the source wirings. This may cause display defects such as shadowing.

SUMMARY

The technology described herein was made in view of the above circumstances. An object is to inhibit a reduction of display quality.

A display device with a position inputting function includes pixel electrodes, signal wiring, position detection electrodes, a position detection wiring, conductive structural objects, bridging wirings, and an insulating film. Te pixel electrodes are linearly disposed. The signal lines are configured to transmit signals supplied to the pixel electrode and disposed to sandwich the pixel electrodes. Each of the position detection electrodes is configured to form a capacitor between the position detection electrode and a position input member and to detect a position of input by the position input member. The position detection wiring is connected to the position detection electrodes. The position detection wiring includes at least first wiring portions and second wiring portions. Each of the first wiring portions is sandwiched between the pixel electrode and the signal wiring. Pairs of the first wiring portions are linearly disposed in an arrangement direction in which the pixel electrodes are disposed. The second wiring portions connect ends of the first wiring portions adjacent to each other in the arrangement direction. The conductive structural objects are disposed such that at least sections of the conductive structural objects are disposed in a layer in which the position detection wiring is disposed. The bridging wirings are disposed to cross the conductive structural objects. The bridging wirings include sections connected to ends of the first wiring portions adjacent to each other in the arrangement direction or ends of the first wiring portions on the same side with respect to the arrangement direction through contact holes. The ends of the first wiring portions adjacent to each other in the arrangement direction are not connected to the second wiring portions. An insulating film is disposed between the conductive structural objects and the bridging wirings. The insulating film includes the contact holes.

According to the configuration, the pixel electrodes that are linearly disposed are charged to potentials based on signals supplied to the pixel electrodes through either one of the signal wirings and image display is performed. The position detection electrodes and the position input member form the capacitors and the position of input by the position input member is detected using the signals supplied through the position detection wiring. The position detection wiring includes the first wiring portions and the second wiring portion. The pairs of the first wiring portions are linearly arranged in the arrangement direction in which the pixel electrodes are arranged. The ends of the first wiring portions adjacent to each other in the arrangement direction are connected via the second wiring portions. According to the configuration, the signals are supplied to the position detection electrodes. The pixel electrodes are sandwiched between the signal wirings. Therefore, parasitic capacitances appear between the pixel electrodes and the signal wirings. The parasitic capacitances and variations in potential of the pixel electrodes based on variations in potential of the signal wirings can be compensated by supplying signals with inverted polarities to the signal wirings. The first wiring portions of the position detection wiring are sandwiched between the pixel electrodes and the signal wirings (i.e., first-side first wiring portions among the first wiring portions are sandwiched between the pixel electrodes and one of the first signal wirings and second-side first wiring portions among the first wiring portions are sandwiched between the pixel electrodes and the other one of the first signal wirings). This configuration is preferable for equalizing the parasitic capacitance between the pixel electrodes and one of the signal wirings and the parasitic capacitance between the pixel electrodes and the other one of the signal wirings. Especially, in the configuration in which positional relations of the first-side first wiring portions and one of the signal wirings (distances and wiring widths) relative to the pixel electrodes are about equal to the positional relations of the second-side first wiring portions and the other one of the signal wirings, the above-described configuration is further preferable for equalizing the parasitic capacitances. By supplying the signals with inverted polarities to the signal wirings, the variations in potential of the pixel electrodes due to the variations in potential of one of the signal wirings and the variations in potential of the pixel electrodes due to the variations in potential of the other one of the signal wirings are compensated by the parasitic capacitance that are about equal to each other. Therefore, the reduction in display quality such as shadowing is less likely to occur.

Furthermore, the position detection wiring is disposed in the layer in which at least the portions of the conductive structural objects are disposed. In comparison to a configuration in which the position detection wiring and the conductive structural objects are disposed in different layers that are separated from each other by an insulating film, the number of layers can be reduced. Therefore, the production cost can be reduced. In the configuration in which the conductive structural objects are disposed in the layer in which the positon detection wiring is disposed, routing of the position detection wiring may be difficult depending on arrangement of the conductive structural objects or a wire resistance of the position detection wiring may increase because of an increase in length due to diverting of the position detection wiring around the conductive structural objects. By connecting the portions of the position detection wiring by the bridging wirings that are disposed to cross the conductive structural objects with the insulating film disposed between the conductive structural objects and the bridging wirings, the position detection wiring can be routed or the wire resistance of the position detection wiring can be reduced while short-circuits between the position detection wiring and the conductive structural objects are reduced. The sections of the bridging wirings are connected to the ends of the first wiring portions which are adjacent to each other in the arrangement direction and not connected to the second wiring portions or the ends of the first wiring portions on the same side with respect to the arrangement direction. With the position detection wiring having the reduced wire resistance, the accuracy in detection of position of input by the position input member improves. Furthermore, variations in potential are less likely to occur upon switching of signals transmitted to through the position detection wiring. This configuration inhibits the reduction in display quality.

According to the technology described herein, the reduction in display quality can be inhibited.

DETAILED DESCRIPTION

First Embodiment

Figure 1:
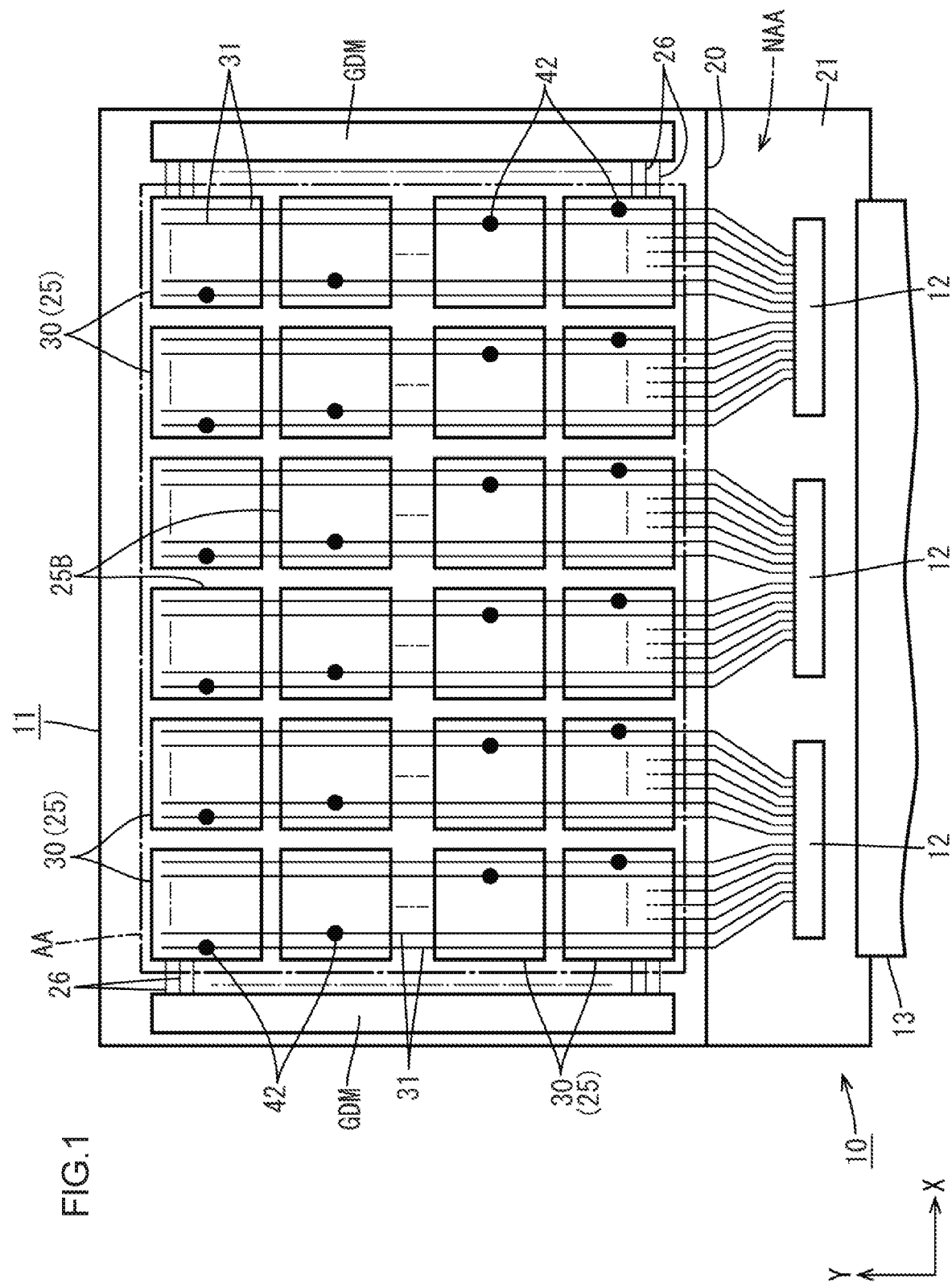
FIG. 1 is a plan view illustrating two-dimensional arrangement of touch electrodes, touch wirings, and source wirings of a liquid crystal panel included in a liquid crystal display device according to a first embodiment.

A first embodiment of the technology described herein will be described with reference to FIGS. 1 to 7. In this section, a liquid crystal display device 10 (a display device with a position input function) will be described. The liquid crystal display device 10 has a touchscreen function (a position inputting function). X-axes, Y-axes, and Z-axes may be present in the drawings. The axes in each drawing correspond to the respective axes in other drawings. An upper side and a lower side in FIGS. 5 to 7 correspond to a front side and a back side of the liquid crystal display device 10, respectively.

As illustrated in FIG. 1, the liquid crystal display device 10 includes at least a liquid crystal panel 11 (a display panel) and a backlight unit (a lighting device). The liquid crystal panel 11 is in a horizontally-long rectangular shape and configured to display images. The backlight unit is an external light source to illuminate the liquid crystal panel 11 for image display. The liquid crystal panel 11 has a screen size of about 32 inches (more precisely, 32.2 inches) and a resolution corresponding to 4K. The backlight unit is disposed behind the liquid crystal panel 11. The backlight unit includes light sources configured to emit white light (e.g., LEDs) and optical members for converting the light from the light sources into planar light by applying optical effects to the light from the light sources. The backlight is not illustrated in the drawings.

As illustrated in FIG. 1, an inner area of the liquid crystal panel 11 is configured as a display area AA in which images are displayed (an area defined by a chain line in FIG. 1). An outer area in a frame shape surrounding the display area AA is configured as a non-display area NAA of the liquid crystal panel 11 in which the images are not displayed. In the non-display area NAA, drivers 12 (driver circuits) and a flexible circuit board 13 (a signal transmitting portion) which are components for supplying various kinds of signals related to a display function and a touchscreen function are mounted. The drivers 12 are LSI chips including driver circuits therein and mounted in the non-display area NAA of the liquid crystal panel 11 through the chip-on-glass (COG) technology. The drivers 12 process the signals transmitted via the flexible circuit board 13. In this embodiment, three drivers 12 are disposed at intervals in the X-axis direction in the non-display area NAA of the liquid crystal panel 11. The flexible circuit board 13 includes a synthetic resin substrate (e.g., polyimide-based resin substrate) having insulating property and flexibility and multiple wirings (not illustrated) formed on the substrate. A first end of the flexible circuit board 13 is connected to the non-display area NAA of the liquid crystal panel 11 and a second end of the flexible circuit board 13 is connected to a control circuit board (a signal source). The signals from the control circuit board are transmitted to the liquid crystal panel 11 via the flexible circuit board 13, processed by the drivers 12 in the non-display area NAA, and output to the display area AA.

Figure 5:
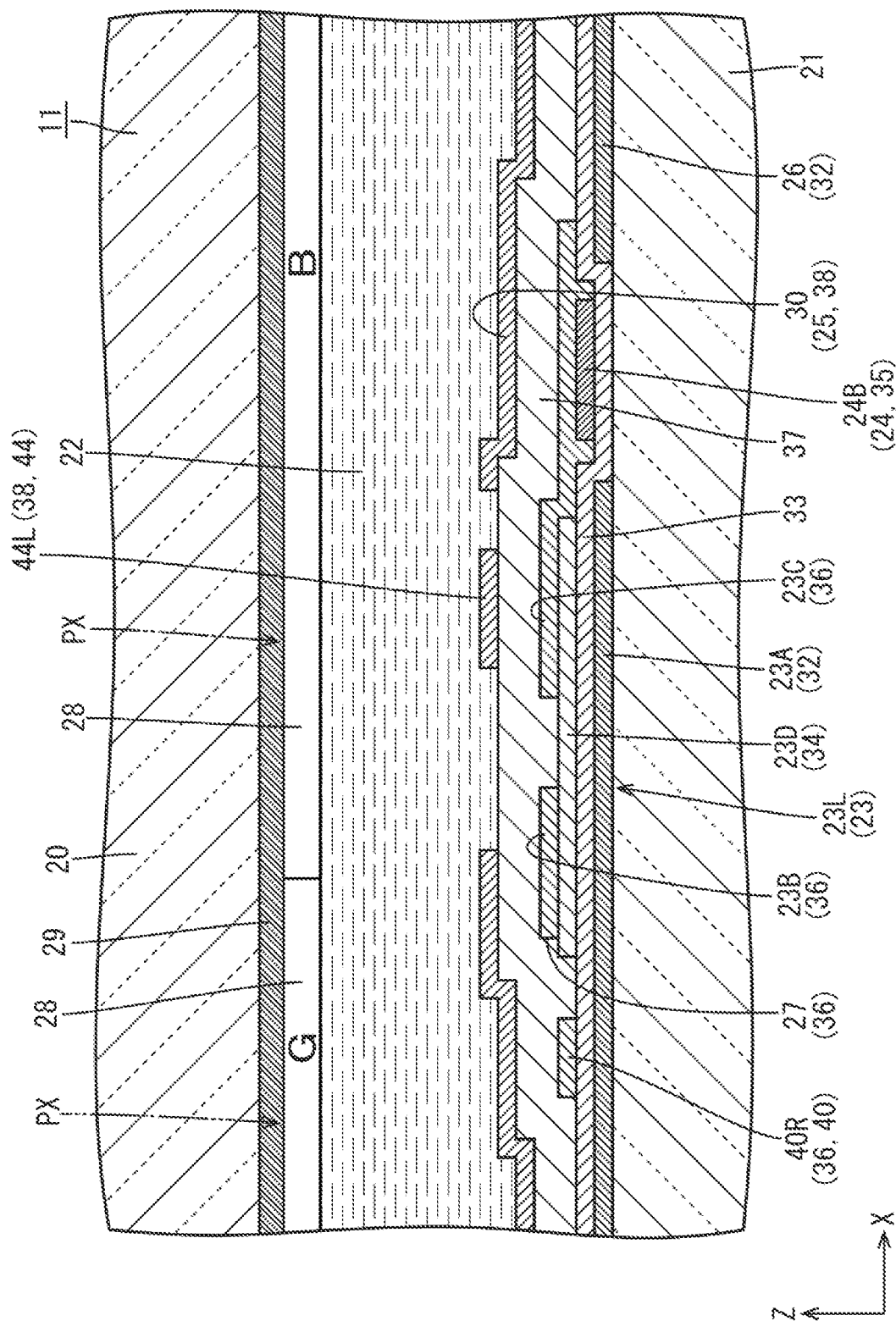
FIG. 5 is a cross-sectional view along line A-A in FIG. 2.

The liquid crystal panel 11 will be described in detail. As illustrated in FIG. 5, the liquid crystal panel 11 includes a pair of substrates 20 and 21 and a liquid crystal layer 22 (a medium layer) between the substrates 20 and 21. The liquid crystal layer 22 contains liquid crystal molecules that are substances having optical characteristics that change according to application of an electric field. The liquid crystal layer 22 is surrounded by a sealing member, which is not illustrated, disposed between the substrates 20 and 21. The liquid crystal layer 22 is sealed by the sealing member. One of the substrates 20 and 21 on the front side is the CF substrate 20 (a common substrate) and the other on the rear side (back side) is the array substrate 21 (an active matrix substrate, a component substrate). The CF substrate 20 and the array substrate 21 include substantially transparent glass substrates and various films formed in layers on the glass substrates. Polarizing plates (not illustrated) are attached to outer surfaces of the substrates 20 and 21.

Figure 2:
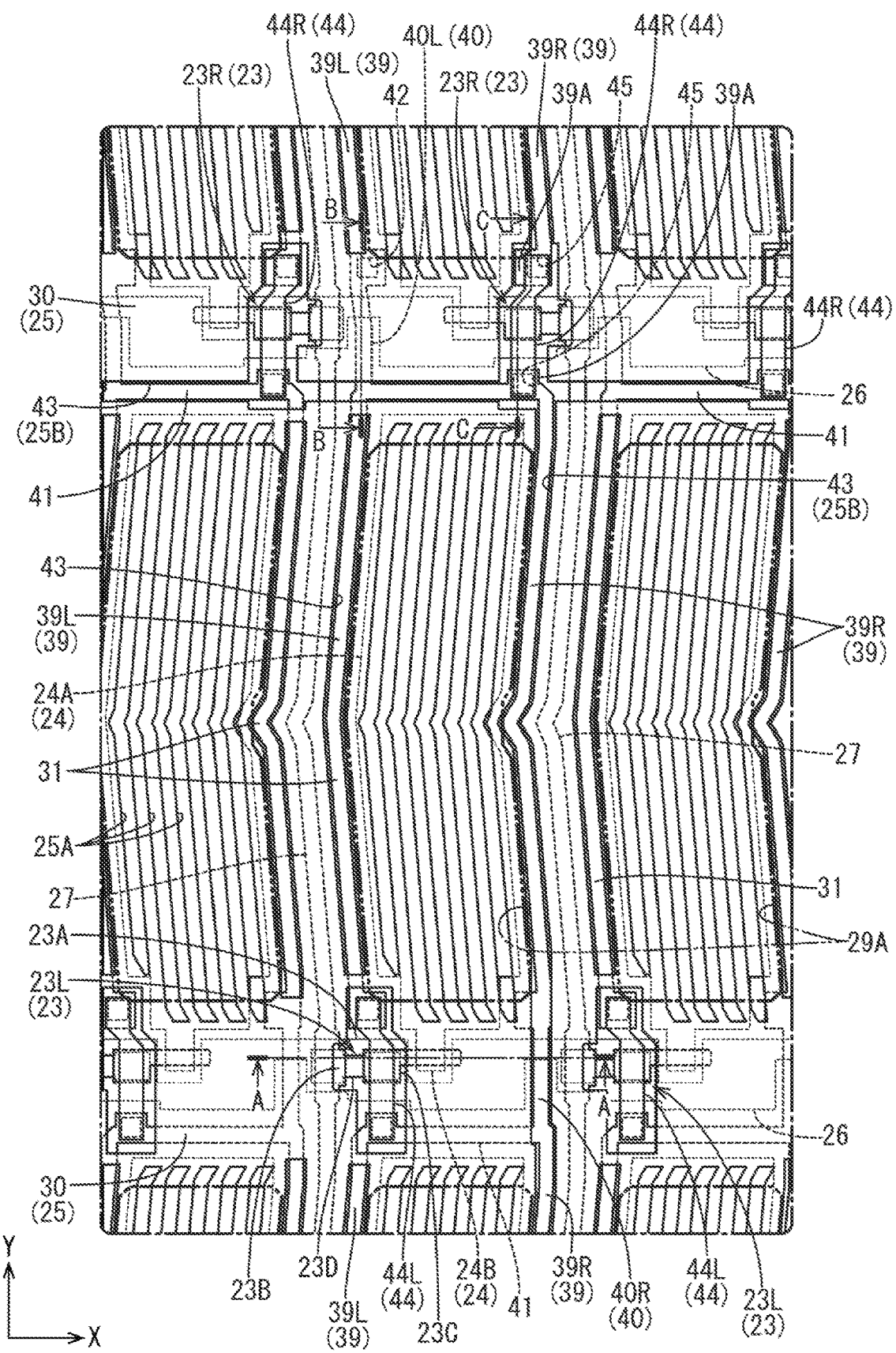
FIG. 2 is a plan view illustrating arrangements of pixels on an array substrate and a CF substrate included in the liquid crystal panel.

As illustrated in FIG. 2, thin film transistors 23 (TFTs, switching components) and pixel electrodes 24 are arranged in a matrix in an area of an inner surface of the array substrate 21 (on a liquid crystal layer 22 side, on an opposed surface side opposed to the CF substrate 20) in the display area AA. Lines of the TFTs 23 and lines of the pixel electrodes 24 are arranged along the X-axis direction and the Y-axis direction. Gate wirings 26 (scanning wirings) and source wirings 27 (signal wirings, data wirings) are routed perpendicular to each other to surround the TFTs 23 and the pixel electrodes 24. The gate wirings 26 extend in a direction substantially along the X-axis direction. The source wirings 27 extend in a direction substantially along the Y-axis direction. The gate wirings 26 are connected to gate electrodes 23A of the TFTs 23. The source wirings 27 are connected to source electrodes 23B of the TFTs 23. The pixel electrodes 24 are connected to drain electrodes 23C of the TFTs 23. The TFTs 23 are driven based on various kinds of signals supplied to the gate wirings 26 and the source wirings 27. Through the driving of the TFTs 23, application of voltages to the pixel electrodes 24 is controlled. Each pixel electrode 24 has a vertically-long rectangular shape in a plan view (more specifically, long sides are bent along the source wirings 27). A short direction of each pixel electrode 24 corresponds with a direction in which the gate wirings 26 extend. A long direction of each pixel electrode 24 corresponds with a direction in which the source wirings 27 extend. Each pixel electrodes 24 is sandwiched between the gate wirings 26 with respect to the Y-axis direction (a direction in which the pixel electrodes 24 are arranged in lines, a first direction, a column direction) and between the source wirings 27 with respect to the X-axis direction (a direction in which the lines of the pixel electrodes 24 are arranged, a second direction, a row direction). The TFTs 23 and the pixel electrodes 24 are conductive structural objects on the array substrate 21. Arrangements of the TFTs 23, the pixel electrodes 24, the gate wirings 26, and the source wirings 27 will be described later. As illustrated in FIG. 1, gate driver monolithic circuits GDM for supplying scan signals to the gate wirings 26 are disposed in the non-display area NAA of the array substrate 21.

As illustrated in FIG. 5, a common electrode 25 is formed to overlap all pixel electrodes 24 on an upper layer side relative to the pixel electrodes 24 (closer to the liquid crystal layer 22) in the display area AA on an inner surface side of the array substrate 21. The common electrode 25 spreads over substantially an entire area of the display area AA to apply a reference voltage that is normally about constant. The common electrode 25 includes pixel overlapping openings 25A (pixel overlapping slits, alignment control slits) are formed in areas overlapping the pixel electrodes 24 (specifically, pixel electrode bodies 24A, which will be described later). The pixel overlapping openings 25A extend in a longitudinal direction of the pixel electrodes 24. When a potential difference occurs between the pixel electrode 24 and the common electrode 25 that overlap each other as the pixel electrode 24 is charged, a fringe electric field (an oblique electric field) is generated between an opening edge of the pixel overlapping opening 25A and the pixel electrode 24. The fringe electric field includes a component parallel to the plate surface of the array substrate 21 and a component normal to the plate surface of the array substrate 21. With the fringe electric field, orientations of the liquid crystal molecules included in the liquid crystal layer 22 can be controlled. Namely, the liquid crystal panel 11 according to this embodiment operates in fringe field switching (FFS) mode. The number and the shape of the pixel overlapping openings 25A and areas in which the pixel overlapping openings 25A can be altered from those in the drawings where appropriate.

As illustrated in FIG. 5, color filters 28 that exhibit three different colors of blue (B), green (G), and red (R) are disposed in the display area AA on the inner surface side of the CF substrate 20. The color filters 28 that exhibit different colors are repeatedly arranged along the gate wirings 26 (in the X-axis direction) and the color filters 28 are arranged in lines along the source wirings 27 (substantially the Y-axis direction). Namely, the color filters 28 are arranged in a stripe as a whole. The color filters 28 are arranged to overlap the pixel electrodes 24 on the array substrate 21, respectively, in a plan view. The color filters 28 that are adjacent to each other in the X-axis direction and exhibit different colors each other are arranged such that a boundary therebetween (a color boundary) overlap the source wiring 27 and a light blocking portion 29. In the liquid crystal panel 11, the R, the G, and the B color filters that are arranged along the X-axis direction and three pixel electrodes 24 opposed to the respective color filters 28 compose three colors of pixels PX. In the liquid crystal panel 11, the R, the G, and the B pixels PX that are adjacent to one another in the X-axis direction form a display pixel configured to perform color display in predefined tones. An interval of the pixels PX in the X-axis direction is about 60 μm (specifically, 62 μm). An interval of those in the Y-axis direction is about 180 μm (specifically, 186 μm).

As illustrated in FIGS. 2 and 5, the light blocking portion 29 (an inter-pixel portion, a black matrix) configured to block light is formed in the display area AA on the inner surface side of the CF substrate 20. The light blocking portion 29 is formed in a grid pattern in a plan view to separate the adjacent pixels PX (the pixel electrodes 24). The light blocking portion 29 includes pixel openings 29A at positions overlapping large areas of the pixel electrodes 24 on the array substrate 21 side in a plan view. The pixel openings 29A are arranged in a matrix within the plate surface of the CF substrate 20. The numbers of the pixel openings 29A are arranged in the X-axis direction and the Y-axis direction. Each pixel opening 29A has a vertically-long rectangular two-dimensional shape along an outline of the pixel electrode 24. The pixel openings 29A pass light therethrough for display at the pixels PX. The light blocking portion 29 restricts light from traveling between the adjacent pixels PX to ensure independency of tones of each pixel PX. Especially, sections of the light blocking portion 29 extending along the source wirings 27 reduce color mixture between the pixels PX that exhibit different colors. The light blocking portion 29 overlaps at least the gate wirings 26 and the source wirings 27 (including touch wirings 31, which will be described later) on the array substrate 21 in a plan view. A planarization film (not illustrated) is formed in a solid pattern over the color filters 28 (on a liquid crystal layer 22 side) on an entire area of the CF substrate 20. Alignment films (not illustrated) for orienting the liquid crystal molecules in the liquid crystal layer 22 are formed on innermost surfaces of the substrates 20 and 21 in contact with the liquid crystal layer 22.

The liquid crystal panel 11 according to this embodiment has a display function for displaying images and a touch-screen function (a position input function) for detecting positions of input by a user performs based on displayed images (input positions). The liquid crystal panel 11 includes an integrated touchscreen pattern (with an in-cell technology) for exerting the touchscreen function. The touchscreen pattern uses so-called a projection type electrostatic capacitance method. A self-capacitance method is used for detection. As illustrated in FIG. 1, the touchscreen pattern includes touch electrodes 30 (position detection electrodes) are disposed on the array substrate 21 of the pair of substrates 20 and 21 and arranged in a matrix within the plate surface of the array substrate 21. The touch electrodes 30 are disposed in the display area AA of the array substrate 21. The display area AA of the liquid crystal panel 11 substantially corresponds with a touch area in which input positions are detectable (a position input area). The non-display area NAA substantially corresponds with a non-touch area in which input positions are not detectable (a non-position input area). When the user intends to input a position based on a displayed image in the display area AA of the liquid crystal panel 11 recognized by the user and brings his or her finger (a position input body), which is a conductive member but not illustrated, closer to the surface of the liquid crystal panel 11 (a display surface), a capacitance appears between the finger and the touch electrode 30. The capacitance measured at the touch electrode 30 close to the finger changes as the finger approaches to the touch electrode 30. The capacitance at the touch electrode 30 is different from the capacitance at the touch electrodes 30 farther from the finger. Based on the difference, the input position can be detected.

As illustrated in FIG. 1, the touch electrodes 30 are constructed from the common electrode 25 on the array substrate 21. The common electrode 25 includes a void 25B (separating slits) in addition to the pixel overlapping openings 25A that are described earlier. The void 25B separates the adjacent touch electrodes 30 from each other. The void 25B includes horizontal sections that extend all the way across the common electrode 25 in the X-axis direction and vertical sections that extend all the way across the common electrode in the Y-axis direction. The void 25B has a substantially grid shape as a whole in a plan view. The common electrode 25 is composed of the touch electrodes 30 that are separated by the void 25B to form a grid and electrically independent from one another. The touch electrodes 30 that are provided by dividing the common electrode 25 by the void 25B are arranged in a matrix including lines of the touch electrodes 30 along the X-axis direction and the Y-axis direction in the display area AA. Each touch electrode 30 has a substantially square shape in a plan view with about some millimeters (e.g., two to five millimeters) on a side. Each touch electrode 30 is significantly larger than the pixel PX (or the pixel electrode 24) in the plan view. Each touch electrode 30 is disposed in an area that covers multiple (e.g., several tens or hundreds of) pixels PX with respect to the X-axis direction and the Y-axis direction. Multiple touch wirings 31 (the position detection wirings) on the array substrate 21 are selectively connected to the touch electrodes 30. The touch wirings 31 extend parallel to the source wirings 27 and substantially along the Y-axis direction. The touch wirings 31 are connected to specific ones of the touch electrodes 30 that are arranged along the Y-axis direction. The touch wirings 31 are connected to detection circuits that are not illustrated. The detection circuits may be included in the drivers 12 or may be provided outside the liquid crystal panel 11 and connected via the flexible circuit board 13. The touch wirings 31 supply reference voltage signals related to the image display function and touch signals (position detection signals) related to the touch function to the touch electrodes 30 at different timing. When the reference voltage signals are transmitted to all the touch wirings 31 at the same time, all the touch electrodes 30 are at the reference potential and function as the common electrode 25. FIG. 1 schematically illustrates the arrangement of the touch electrodes 30. The number, the arrangement, and the two-dimensional shape of the touch electrodes 30 may be altered from those in the drawings where appropriate.

Films formed in layers on the inner surface of the array substrate 21 will be described. As illustrated in FIG. 5, on the array substrate 21, a first metal film 32, a gate insulating film 33, a semiconductor film 34, a first transparent electrode film 35 (a conductor film, a transparent electrode film), a second metal film 36 (a conductor film, a metal film), an interlayer insulating film (an insulating film, a transparent interlayer insulating film), and a second transparent electrode film 38 are formed in layers in this sequence from a lower layer side (on a glass substrate side) on the array substrate 21. Each of the first metal film 32 and the second metal film 36 is a single layer film made of one kind of metal selected from copper, titanium, aluminum, molybdenum, and tungsten. Alternatively, each of the first metal film 32 and the second metal film 36 is a laminated film made of different kinds of metals or alloy. The first metal film 32 and the second metal film 36 have conductivity and light blocking properties. The gate wirings 26 and the gate electrodes 23A of the TFTs 23 first metal film 32 are constructed from the first metal film 32. The source wiring 27, the touch wiring 31, and the source electrodes 23B and the drain electrodes 23C of the TFTs 23 are constructed from the second metal film 36. The gate insulating film 33 and the interlayer insulating film 37 are made of non-organic material such as silicon nitride and silicon oxide. The gate insulating film 33 insulates the first metal film 32 on the lower layer side from the semiconductor film 34, the first transparent electrode film 35, and the second metal film 36 on the upper layer side. The interlayer insulating film 37 insulates the semiconductor film 34, the first transparent electrode film 35, and the second metal film 36 on the lower layer side from the second transparent electrode film 38 on the upper layer side. The semiconductor film 34 is a thin film made of oxide semiconductor or amorphous silicon. The semiconductor film 34 forms channels 23D (semiconductor portions of the TFTs 23 connected to the source electrodes 23B and the drain electrodes 23C. The first transparent electrode film 35 and the second transparent electrode film 38 are made of transparent electrode material (e.g., indium tin oxide (ITO), indium zinc oxide (IZO)). The first transparent electrode film 35 forms at least the pixel electrodes 24. The second transparent electrode film 38 forms at least the common electrode 25, or the touch electrodes 30, (see FIG. 4).

Figure 3:
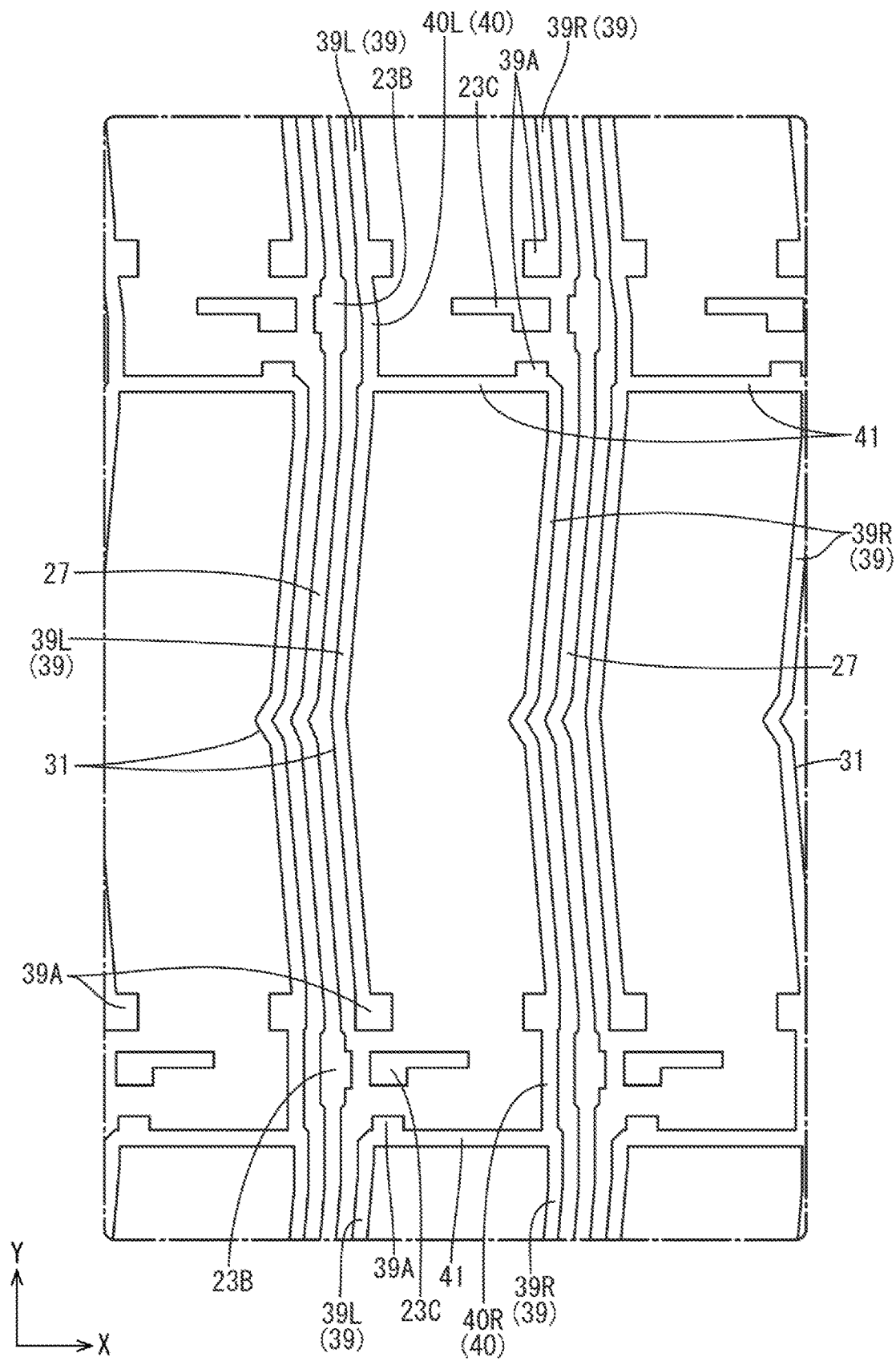
FIG. 3 is a plan view illustrating a second metal film pattern on the array substrate included in the liquid crystal panel.

The configurations of the TFTs 23 and the pixel electrodes 24 will be described in detail. As illustrated in FIG. 2, each TFT 23 has a horizontally-elongated shape that extends along the X-axis direction as a whole. Each TFT 23 is disposed immediately below the pixel electrode 24 to be connected with respect the Y-axis direction in FIG. 2. Each TFT 23 includes the gate electrode 23A that is a portion of the gate wiring 26 (a portion overlapping at least the source wiring 27). The gate electrode 23A has a horizontally-elongated shape that extends along the X-axis direction. The TFT 23 is driven based on scanning signals supplied to the gate wiring 26 and thus a current between the source electrode 23B and the drain electrode 23C is controlled. As illustrated in FIGS. 2 and 3, the TFT 23 includes the source electrode 23B that is a portion of the source wiring 27 (a portion overlapping the gate wiring 26). The source electrode 23B is disposed at a first end of the TFT 23 with respect to the X-axis direction such that about an entire area of the source electrode 23B overlaps the gate electrode 23A. The source electrode 23B is connected to the channel 23D. The TFT 23 includes the drain electrode 23C disposed at a position separated from the source electrode 23B, that is, a second end of the TFT 23 with respect to the X-axis direction. The drain electrode 23C extends substantially along the X-axis direction. A first end of the drain electrode 23C is opposed to the source electrode 23B and overlaps the gate electrode 23A. The first end of the drain electrode 23C is connected to the channel 23D. The second end is connected to the pixel electrode 24. In this embodiment, the source electrode 23B and the drain electrode 23C have single layer structures constructed from the second metal film 36. However, the source electrode 23B and the drain electrode 23C may be configured as laminated structures of the first transparent electrode film 35 and the second metal film 36.

As illustrated in FIG. 2, the pixel electrodes 24 include pixel electrode bodies 24A and the contact portions 24B. Each pixel electrode body 24A has a substantially square shape overlapping the corresponding pixel opening 29A of the light blocking portion 29. Each contact portion 24B protrudes from the pixel electrode body 24A in the Y-axis direction toward the FTT 23 side. The contact portions 24B are connected to the second ends of the drain electrodes 23C. Sections of the gate wirings 26 overlapping the contact portions 24B and the drain electrodes 23C are cut out. Cutouts of the gate wirings 26 are provided to reduce the capacitances between the gate wirings 26 and the pixel electrodes 24. The second ends of the drain electrodes 23C overlap the gate wirings 26. In the production of the array substrate 21, even if the drain electrodes 23C are displaced relative to the gate wirings 26, the capacitances between the gate wirings 26 and the drain electrodes 23C (namely, the pixel electrodes 24) are less likely to vary. The TFTs 23 include the channels 23D that overlap the gate electrodes 23A via the gate insulating film 33. The channels 23D are connected to the source electrodes 23B and the drain electrodes 23C. The channels 23D overlap the gate electrodes 23A and extend along the X-axis direction. First ends of the channels 23D are connected to the source electrodes 23B and second ends of the channels 23D are connected to the drain electrodes 23C. When the TFTs 23 are turned on according to the scanning signals supplied to the gate electrodes 23A, image signals (single, data signals) supplied to the source wirings 27 are transmitted from the source electrodes 23B to the drain electrodes 23C via the channels 23D that are constructed from the semiconductor film 34. As a result, the pixel electrodes 24 are charged to potentials based on the image signals. Sections of the common electrode 25 overlapping the channels 23D are cut out. The cutouts of the common electrode 25 are provided for reducing variations in leak current between the source electrodes 23B and the drain electrodes 23C according to variations in potential of the common electrode 25 (the touch electrodes 30) when the TFTs 23 are turned off.

As illustrated in FIG. 2, the TFTs 23 disposed in the display area AA of the array substrate 21 include first TFTs 23R (first switching components) and second TFTs 23L (second switching components). The TFTs 23R are located on the right side (the first end side) relative to the pixel electrodes 24 with respect to the X-axis direction in FIG. 2. The second TFTs 23L are located closer to the left side (the second end side) relative to the pixel electrodes 24 with respect to the X-axis direction in FIG. 2. Hereinafter, when the TFTs 23 on the right side and the TFTs 23 on the left side in FIG. 2 are distinguished from each other, the TFTs 23 on the right side will be referred to as the first TFTs with reference symbol 23R and the TFTs 23 on the left side will be referred to as the second TFTs with reference symbol 23L. When they are not distinguished from each other, they are referred to as the TFTs with reference symbol 23. The first TFTs 23R and the second TFTs 23L are disposed to sandwich the pixel electrodes 24 from sides with respect to the Y-axis direction. The first TFTs 23R and the second TFTs 23L are alternately arranged with respect to the Y-axis direction, that is, arrangement in a zigzag manner in a plan view. The first TFTs 23R and the second TFTs 23L are disposed such that the source electrodes 23B and the drain electrodes 23C of the first TFTs 23R and the second TFTs 23L are the other way around with respect to the X-axis direction. The first TFTs 23R are connected to the source wirings 27 on the right side in FIG. 2 among the source wirings 27 that sandwich the pixel electrodes 24 from the sides with respect to the X-axis direction. The second TFTs 23L are connected to the source wirings 27 on the left side in FIG. 2. The first TFTs 23R are adjacent to the pixel electrodes 24 in the middle in FIG. 2 and the pixel electrodes 24 at the uppermost in FIG. 2 with respect to the Y-axis direction. The first TFTs 23R are connected to the pixel electrodes 24 at the uppermost in FIG. 2. The second TFTs 23L are connected to the pixel electrodes 24 in the middle in FIG. 2. The TFTs 23L and 23R are connected to the pixel electrodes 24 that are immediately above with respect to the Y-axis direction in FIG. 2, respectively. According to the configuration, the pixel electrodes 24 that are adjacent with respect to the Y-axis direction and located at the uppermost in FIG. 2 are charged to the predefined potentials when the first TFTs 23R connected to the pixel electrodes 24 are driven and the signals transmitted to the source wirings 27 on the right side in FIG. 2 among the source wirings 27 are supplied to the pixel electrodes 24 at the uppermost. The pixel electrodes 24 in the middle in FIG. 2, which are the other pixel electrodes 24 adjacent with respect to the Y-axis direction, are charged to the predefined potentials when the second TFTs 23L connected to the pixel electrodes 24 are driven and the signals transmitted to the source wirings 27 on the left side in FIG. 2 are supplied to the pixel electrodes 24 in the middle. The signals transmitted to the different source wirings 27 are supplied to the pixel electrodes adjacent with respect to the Y-axis direction. This is preferable for arranging pixels with polarities in the same manner as pixels in dot inverting driving to drive the pixels with lower power consumption.

Next, the configuration of the touch wirings 31 will be described in detail. As illustrated in FIGS. 2 and 3, each touch wiring 31 includes at least pairs of first wiring potions 39. The first wiring portions 39 in each pair sandwich the corresponding pixel electrode 24 from sides with respect to the X-axis direction. The first wiring portions 39 in each pair are disposed in areas between the pixel electrode 24 and the source wirings 27 that sandwich the pixel electrode 24 from the sides with respect to the X-axis direction. The first wiring portions 39 in each pair are parallel to edges (long edges) of the pixel electrode 24 and the source wirings in the corresponding pair. The first wiring portions 39 extend substantially along the Y-axis direction and have a length about equal to a long dimension of the pixel electrode 24. The pairs of the first wiring portions 39 are linearly arranged in the Y-axis direction. The number of the pairs is equal to the number of the pixel electrodes 24 linearly arranged in the Y-axis direction. The contact portions 24B of the pixel electrodes 24 are disposed between ends of the first wiring portions 39 in the respective pairs on the lower side in FIGS. 2 and 3 (on the same side with respect to the Y-axis direction). The touch wirings 31 are composed of the pairs of the first wiring portions 39. The first wiring portions 39 in each pair are disposed in the areas between the pixel electrode 24 and the source wirings 27 in the corresponding pair. This configuration is preferable for equalizing a parasitic capacitance between the pixel electrode 24 and one of the source wirings 27 to a parasitic capacitance between the pixel electrode 24 and the other one of the source wirings 27. By supplying signals with opposite polarities to the source wirings 27 that sandwich the pixel electrode 24 from the sides with respect to the X-axis direction, respectively, a variation in potential of the pixel electrode 24 according to a variation in potential of one of the source wirings 27 and a variation in potential of the pixel electrode 24 according to a variation in potential of the other one of the source wirings 27 are compensated because of the parasitic capacitances that are about equal to each other. Namely, when the TFT 23 is in an off state, the variation in potential of the pixel electrode 24 is reduced. According to the configuration, a reduction in display quality such as shadowing is less likely to occur.

As illustrated in FIGS. 2 and 3, the touch wirings 31 include second wiring portions 40 that bridge ends of the first wiring portions 39 adjacent to each other with respect to the Y-axis direction. Because the ends of the first wiring portions 39 adjacent to each other with the Y-axis direction are bridged by the second wiring portions 40, the touch wirings 31 extend to cross the pixel electrodes 24 that are linearly arranged in the Y-axis direction. According to the configuration, the signals are supplied to the touch electrodes 31 at predefined Y-axis positions in the display area AA. Hereinafter, when one of the first wiring portions 39 in each pair sandwiching the corresponding pixel electrode 24 with respect to the X-axis direction on the right side and the other one of the first wiring portions on the left side in FIG. 2 are distinguished from each other, the first wiring portion 39 on the right side will be referred to as first-side first wiring portions with reference symbol 39R and the first wiring portion 39 on the left side will be referred to as second-side first wiring portions with reference symbol 39L. When they are not distinguished from each other, they are referred to as the first wiring portions with reference symbol 39.

Specifically, as illustrated in FIGS. 2 and 3, the second wiring portions 40 include first-side second wiring portions 40R and second-side second wiring portions 40L. Each first-side second wiring portion 40R connects one of the first-side first wiring portions 39R that are adjacent to each other in the Y-axis direction to the other one of the first-side first wiring portions 39R. Each second-side second wiring portion 40L connects one of the second-side first wiring portions 39L that are adjacent to each other in the Y-axis direction to the other one of the second-side first wiring portions 39L. Hereinafter, when the second wiring portions 40 connected to the first-side first wiring portions 39R and the second wiring portions 40 connected to the second-side first wiring portions 39L are distinguished from each other, the former will be referred to as first-side second wiring portions with reference symbol 40R and the later will be referred to as second-side second wiring portions with reference symbol 40L. When they are not distinguished from each other, they are referred to as the second wiring portions with reference symbol 40. The first-side second wiring portions 40R are located on the right side in FIG. 2 relative to the pixel electrodes 24 with respect to the X-axis direction. The first-side second wiring portions 40R do not overlap the second TFTs 23L located on the left side. The second-side second wiring portions 40L are located on the left side in FIG. 2 relative to the pixel electrodes 24 with respect to the X-axis direction. The second-side second wiring portions 40L do not overlap the first TFTs 23R located on the right side. The first-side second wiring portions 40R and the second-side second wiring portions 40L are alternately arranged in the Y-axis direction to cover areas in which the TFTs 23 are not disposed. The first-side second wiring portions 40R and the second-side second wiring portions 40L arranged in a zigzag manner in the plan view. The second wiring portions 40 are disposed in areas in which the TFTs 23 are not disposed as if to fill the areas.

As illustrated in FIGS. 2 and 3, the touch wirings 31 further include third wiring portions 41 that extend from the first wiring portions 39 in pairs to sandwich the respective pixel electrodes 24. Each third wiring portion 41 bridges ends of the first wiring portions 39 in the corresponding pair with respect to the longitudinal direction of the first wiring portions 39 (the Y-axis direction), that Is, the ends of the first wiring portions 39 on the upper side in FIGS. 2 and 3, or an opposite side from the TFTs 23 (on a side closer to the contact portions 24B). Each third wiring portion 41 linearly extends in the X-axis direction and has a length about equal to a short dimension of the pixel electrodes 24. The first wiring portions 39 and the third wiring portion 41 of each touch wiring 31 are disposed to surround the corresponding pixel electrode 24 on three sides other than a side closer to the TFT 23. The first trade portions 39, the second wiring portions 40, and the third wiring portions 41 of the touch wirings 31 are constructed from the second metal film 36. Therefore, the touch wirings 31 are in the same layer as the source wirings 27. In comparison to a configuration in which the source wirings and the touch wirings are disposed in different layers separated by an insulating film, this configuration is preferable for reducing a production cost. The touch wirings 31 are disposed in the layer in which portions of the TFTs 23 (the source electrodes 23B and the drain electrodes 23C), which are the conductive structural objects, are disposed. In comparison to a configuration in which the touch wirings 31 are disposed in a layer different from the layer in which the portions of the TFTs 23 are disposed and an insulating film is disposed between the layers, the number of the layers can be reduced. The configuration of this embodiment can contribute to a reduction of production cost. Furthermore, the second metal film 36 that forms the source wirings 27 and the touch wirings 31 and the first transparent electrode film 35 are disposed in upper layers relative to the gate insulating film 33. Namely, the source wirings 27 and the touch wirings 31 are disposed in the same layer as the pixel electrodes 24. In comparison to a configuration in which the pixel electrodes are disposed in a layer separated from a layer in which the source wirings 27 and the touch wirings 31 are disposed by an insulating film, parasitic capacitances between the pixel electrodes 24 and the source wirings 27 are larger. Whether the touch wirings 31 are disposed between the pixel electrodes 24 and the source wirings 27 is more likely to be a problem. Therefore, a reduction in display quality is more likely to occur. According to the configuration in which the first wiring portions 39 of the touch wirings 31 are sandwiched between the source wirings 27 and the pixel electrodes 24, the parasitic capacitances are equalized. This configuration is preferable for reducing occurrence of the reduction in display quality. Furthermore, this configuration is preferable for further reducing the production cost. The second wiring portions 40 are not overlap the TFTs 23 that include the portions formed from the second metal film 36. Therefore, short-circuits are less likely to occur between the touch wirings 31 and the TFTs 23.

Figure 6:
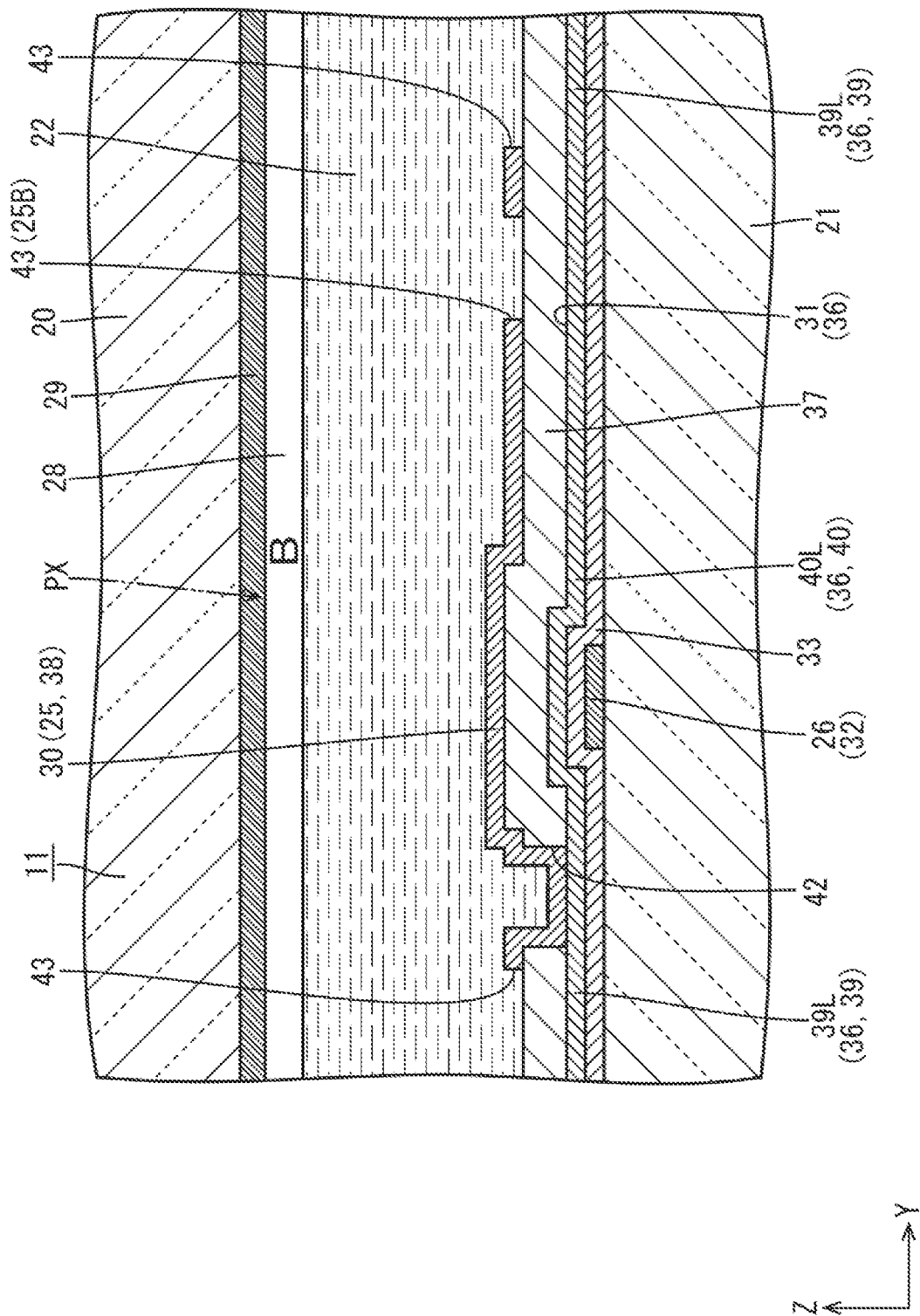
FIG. 6 is a cross-sectional view along line B-B in FIG. 2.

A connecting structure of the touch electrodes 30 and the touch wirings 31 will be described. As illustrated in FIGS. 2 and 6, the touch wirings 31 are connected to the corresponding touch electrodes 30 via touch contact holes 42 (position detection contact holes) formed in the interlayer insulating film 37. The touch wirings 31 extend substantially in the Y-axis direction to horizontally cross all the touch electrodes 30. The touch wirings 31 are selectively connected to the touch electrodes 30 specified based on the two-dimensional arrangement of the touch contact holes 42. The touch contact holes 42 in this embodiment are arranged at positions overlapping connecting points of the touch wirings 31 with the second-side first wiring portions 39 and the second-side second wiring portions 40L or positions overlapping ends of the first-side first wiring portions 39R on the first TFTs 23R side.

Figure 4:
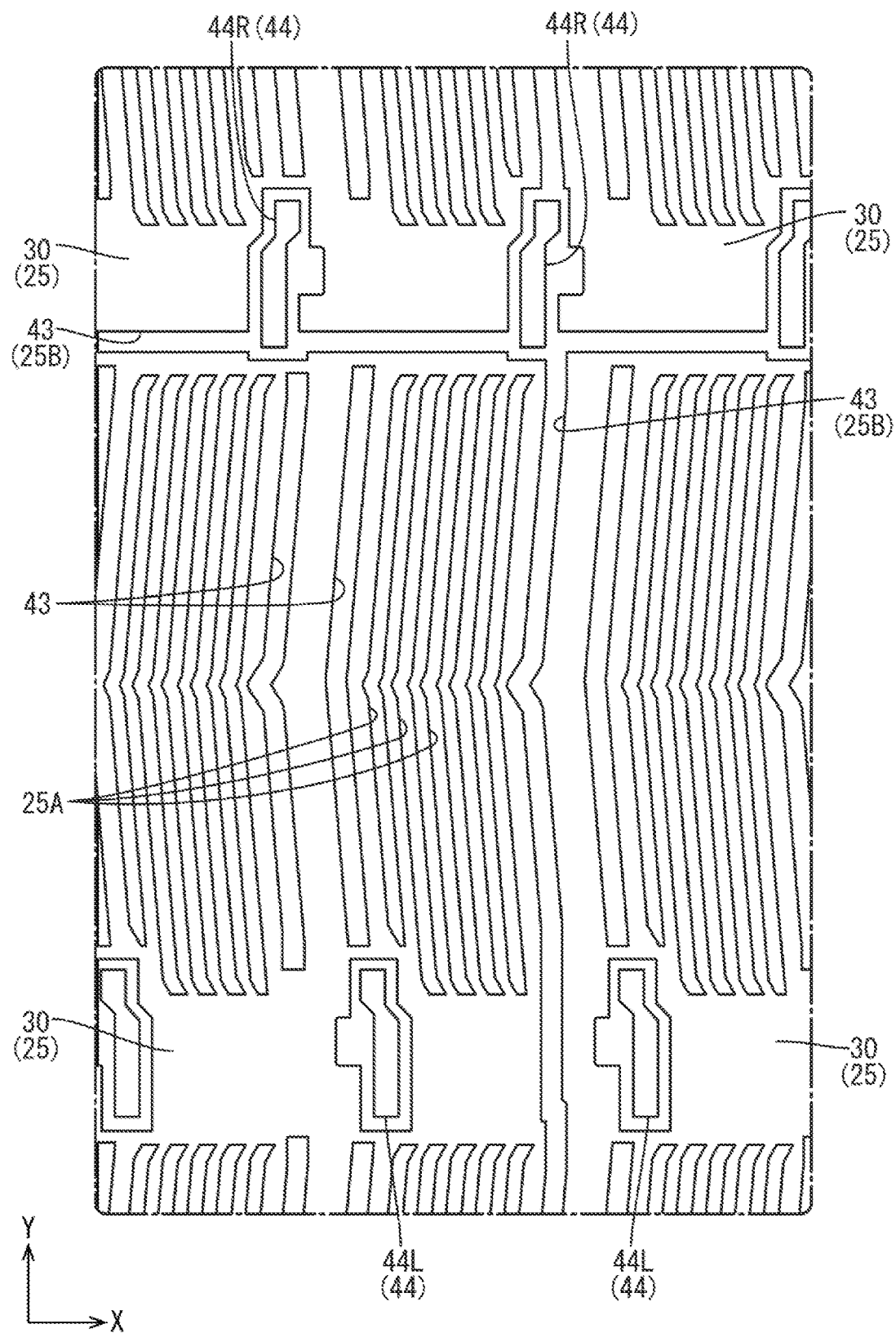
FIG. 4 is a plan view illustrating a second transparent electrode film pattern on the array substrate included in the liquid crystal panel.

As illustrated in FIGS. 2 and 4, the touch electrodes 30 (the common electrode 25) constructed from the second transparent electrode film 38 include touch wiring overlapping openings 43 (position detection wirings overlapping openings) at positions overlapping at least sections of the touch wirings 31. The touch wiring overlapping openings 43 extend parallel to the Y-axis direction corresponding with the direction in which the touch wirings 31 extend. Each touch wiring overlapping opening 43 has a vertically elongated shape (an elongated shape with a long dimension in the direction in which the touch wirings 31 extend) in the plan view. Each touch wiring overlapping opening 43 has a width (a dimension in the X-axis direction) greater than a width of each touch wiring 31 and about equal to a width of each pixel overlapping opening 25A of the common electrode 25. With the touch wiring overlapping openings 43 disposed to overlap at least the sections of the touch wirings 31, parasitic capacitances between the touch wirings 31 and the touch electrodes 30 that are not connected to the touch wirings are reduced. Therefore, proper sensitivities in position detection can be achieved. Specifically, the touch wiring overlapping openings 43 (except for the void 25B, which will be described later) overlap large areas of the first wiring portions 39 of the touch wirings 31. A length of each touch wiring overlapping opening 43 (a dimension in the Y-axis direction) is less than a length of each first wiring portion 39. The touch wiring overlapping openings 43 are less likely to overlap the third wiring portions 41 of the touch wirings 31. In comparison to a configuration in which forming areas of the touch wiring overlapping openings overlap the first wiring portions 39 and the third wiring portions 41, electric resistances of the touch electrodes 30 and the common electrode 25 can be reduced.

Furthermore, as illustrated in FIGS. 2 and 4, the sections of the void 25B in the common electrode 25 which separate the adjacent touch electrodes 30 from each other function as touch wiring overlapping openings 43. Namely, the sections of the void 25B extending along the Y-axis direction overlap the touch wirings 31. Specifically, the sections of the void 25B extending along the Y-axis direction overlap the first-side first wiring portions 39R and the first-side second wiring portions 40R of the touch wirings 31 and sections of the first TFTs 23R. Furthermore, sections of the void 25B extending the X-axis direction overlap the third wiring portions 41 of the touch wirings 31. In areas of the common electrode 25 around the void 25B, electric fields between the gate wirings 26 close to the void 25B and the pixel electrodes 24 may have an adverse effect on image display. Because the third wiring portions 41 of the touch wirings 31 are disposed to overlap the sections of the void 25B extending in the X-axis direction, the electric fields can be blocked and thus display defects are less likely to be produced in the areas around the void 25B. According to the configuration, parasitic capacitances between the touch wirings 31 and the touch electrodes 30 that are not connected to the touch wirings 31 are further properly reduced.

Figure 7:
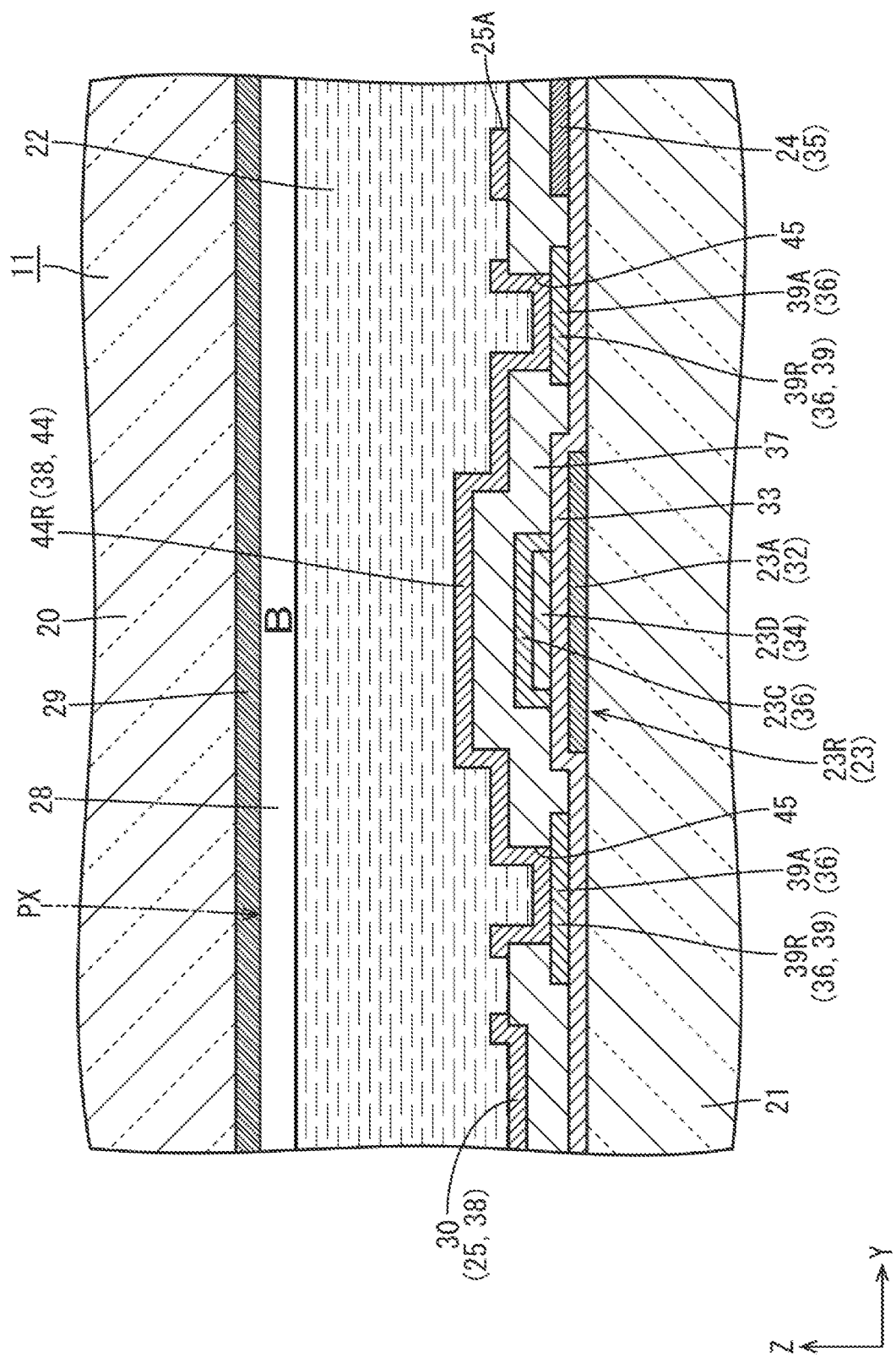
FIG. 7 is a cross-sectional view along line C-C in FIG. 2.

As illustrated in FIGS. 2 and 5, the array substrate 21 in this embodiment includes the bridging wirings 44 (the switching component bridging wirings) disposed to cross the TFTs 23, which are the conductive structural objects. The interlayer insulating film 37 (the insulating film) is disposed between the bridging wirings 44 and the TFTs 23. The bridging wirings 44 are connected to the touch wirings 31. As illustrated in FIGS. 4, 5, and 7, the bridging wirings 44 are constructed from the second transparent electrode film 38 from which the common electrode 25 and the touch electrodes 30 are constructed. The bridging wirings 44 are formed in an island shape by forming annular slits in the second transparent electrode film 38 and physically separated from the common electrode 25 and the touch electrodes 30. The bridging wirings 44 extend substantially in the Y-axis direction. Middle sections of the bridging wirings 44 in the middle of the longitudinal dimension of the bridging wirings 44 overlap the drain electrodes 23C of the TFTs 23. Ends of the bridging wirings 44 at ends of the longitudinal dimension of the bridging wirings 44 overlap the first wiring portions 39 adjacent in the Y-axis direction and forming the touch wirings 31. Specifically, the ends of the bridging wirings 44 overlap the ends of the first wiring portions 39 adjacent in the Y-axis direction closer to the TFTs 23, that is, second wiring portion non-connected ends 39A that are not connected to the second wiring portions 40. The second wiring portion non-connected ends 39A have a width greater than widths of the first wiring portions 39 and the third wiring portions 41. More specifically, one of the ends of each bridging wiring 44 overlaps the second wiring portion non-connected end 39A of the first wiring portion 39 on the upper side in FIG. 2 and the other one of the ends of the bridging wiring 44 overlaps the second wiring portion non-connected end 39A of the first wiring portion 39 on the lower side in FIG. 2. The second wiring portion non-connected end 39A is a connection with the third wiring portion 41. The ends (sections) of the bridging wirings 44 are connected to the first wiring portions 39 that form the touch wirings 31 through contact holes 45 formed in the interlayer insulating film 37. The contact holes 45 are arranged to overlap the second wiring portion non-connected ends 39A of the first wiring portions 39. Because the sections of the bridging wirings 44 are connected to the first wiring portions 39 through the contact holes 45 formed in the interlayer insulating film 37, the touch wirings 31 extend to cross the pixel electrodes 24 in the Y-axis direction.

In this embodiment, the touch wirings 31 are constructed from the second metal film 36, from which the source electrodes 23B and the drain electrodes 23C of the TFTs 23 that are the conductive structural objects. According to the configuration, the number of layers can be reduced. This configuration can contribute to a reduction of production cost. According to the configuration in which the conductive structural objects, that is, the TFTs 23 are disposed in the layer in which the touch wirings 31 are disposed, routing of the touch wirings 31 may be difficult depending on the arrangement of the TFTs 23 or wire resistances of the touch wirings 31 may increase because of increases in length of the touch wirings 31 due to diverting of the touch wirings 31 around the TFTs 23. In this embodiment, the bridging wirings 44 bridge the sections of the touch wirings 31 to each other. The bridging wirings 44 are disposed to cross the TFTs 23 and the interlayer insulating film 37 is disposed between the bridging wirings 44 and the TFTs 23. Therefore, the touch wirings 31 can be routed or the wire resistances of the touch wirings 31 are reduced while short-circuits between the TFTs 23 and the touch wirings 31 are reduced. The sections of the bridging wirings 44 are connected to the second wiring portion non-connected ends 39A that are not connected to the second wiring portions 40 through the contact holes 45 in the interlayer insulating film 37.

As illustrated in FIGS. 2 and 4, the bridging wirings 44 include first bridging wirings 44R (first switching component bridging wirings) and second bridging wirings 44L (second switching component bridging wirings). The first bridging wirings 44R overlap first TFTs 23R. The second bridging wirings 44L overlap second TFTs 23L. When the bridging wirings 44 overlapping the first TFTs 23R and the bridging wirings 44 overlapping the second TFTs 23L are distinguished from each other, the bridging wirings 44 overlapping the first TFTs 23R will be referred to as first bridging wirings with reference symbol 44R and the bridging wirings 44 overlapping the second TFTs 23L will be referred to as second bridging wirings with reference symbol 44L. When they are not distinguished from each other, the bridging wirings are referred to as the bridging wirings 44. The first bridging wirings 44R include middle sections that cross the first TFTs 23R. Ends of each first bridging wiring 44R are connected to the second wiring non-connected ends 39A of the first-side first wiring portions 39R adjacent in the Y-axis direction through the contact holes 45. The second bridging wirings 44L include middle sections that cross the second TFTs 23L. Ends of each second bridging wiring 44L are connected to the second wiring portion non-connected ends 39A of the second-side first wiring portions 39L adjacent in the Y-axis direction through the contact holes 45. The first bridging wirings 44R and the second bridging wirings 44L are alternately arranged in the Y-axis direction in a zigzag manner similar to the TFTs 23. First-side second wiring portions 40R and second-side second wiring portions 40L included in the second wiring portions 40 are arranged in areas in which the bridging wirings 44 and the TFTs 23 are not disposed. The first-side second wiring portions 40R and the second-side second wiring portions 40L are arranged in a zigzag manner in the plan view. The second wiring portions 40 are disposed in the areas in which the bridging wirings 44 and the TFTs 23 are not disposed as if to fill the areas. The first-side first wiring portions 39R of the touch wirings 31 arranged along the Y-axis direction are connected to the first bridging wirings 44R and the first-side second wiring portions 40R to extend for substantially an entire length of the display area AA. The second-side first wiring portions 39L are connected to the second bridging wirings 44L and the second-side second wiring portions 40L to extend for substantially the entire length of the display area AA. The first wiring portions 39 of the touch wirings 31 are connected to the bridging wirings 44 and the second wiring portions 40 that are arranged in the zigzag manner to complement with each other. According to the configuration, the wire resistances of the touch wirings 31 can be reduced. The bridging wirings 44 are disposed to cross the TFTs 23 but the interlayer insulating film 37 is disposed between the bridging wirings 44 and the TFTs 23. Therefore, short circuits between the TFTs 23 and the bridging wirings 44 are less likely to occur. Sections of the bridging wirings 44 crossing the TFTs 23 do not overlap the channels 23D but overlap the drain electrodes 23C. This configuration is for restricting leak currents between source electrodes 23B and the drain electrodes 23C from varying due variations in potential of the common electrode 25 (touch electrodes 30, the touch wirings 31, the bridging wirings 44) when the TFTs 23 are turned off.

As illustrated in FIGS. 2 and 4, the bridging wirings 44 are constructed from the second transparent electrode film 38 and disposed in the layer in which the touch electrodes 30 are disposed. The interlayer insulating film 37 includes touch contact holes 42 (position detection contact holes) in addition to the contact holes 45 described earlier. The touch contact holes 42 are for connecting the touch wirings 31 to the touch electrodes 30. The bridging wirings 44 and the touch electrodes 30 are connected to the touch wirings 31. The contact holes 45 and the touch contact holes 42 are formed in the interlayer insulating film 37 to connect the bridging wirings 44 and the touch electrodes 30 to the touch wirings 31. This configuration is preferable for reducing the production cost.

As described above, the liquid crystal display device 10 (the display device with a position input function) according to this embodiment includes at least the pixel electrodes 24, the pair of the source wirings 27 (signal wirings), the touch electrode 30 (the position detection electrode), the touch wiring 31 (the position detection wiring), the TFTs 23 (the switching components), and the bridging wirings 44. The pixel electrodes 24 are linearly arranged. The source wirings 27 transmit signals supplied to the pixel electrodes 24. The source wirings 27 are disposed to sandwich the pixel electrodes 24. The touch electrodes 30 are configured to form capacitors between the touch electrodes 30 and a finger and to detect a position of input by the finger, which is a position input member for positon input. The touch wirings 31 are connected to the touch electrodes 30. The touch wirings 31 include at least pairs of the first wiring portions 39 and the second wiring portions 40. The first wiring portions 39 are sandwiched between the pixel electrodes 24 and the source wirings 27. The first wiring portions 39 are arranged in pairs in the direction in which the pixel electrodes 24 are arranged. The TFTs 23 are the conductive structural objects including at least the sections disposed in the layer in which the touch wirings 31 are disposed. The bridging wirings 44 are disposed to cross the TFTs 23. The interlayer insulating film 37 (the insulating film) is disposed between the TFTs 23 and the bridging wirings 44. The sections of the bridging wirings 44 are connected to the second wiring portion non-connected ends 39A that are not connected to the second wiring portions 40 through the contact holes in the interlayer insulating film 37.

According to the configuration, the pixel electrodes 24 are charged to the potential based on signals supplied by any one of the source wirings 27 and thus image an image is displayed. The touch electrodes 30 are configured to form the capacitors between the touch electrodes 30 and the finger and to detect the positions of input by the finger using the signals supplied via the touch wirings 31. With the second wiring portions 40 that bridge the ends of the first wiring portions 39, the touch wirings 31 are able to supply signals to the touch electrodes 30. Because the pixel electrodes 24 are sandwiched between the source wirings 27, the parasitic capacitances appear between the pixel electrodes 24 and the source wirings 27. The variation in potential of the pixel electrodes 24 based on the parasitic capacitances and the variations in potential of the source wirings 27 can be compensated by supplying signals with inverted polarities to the source wirings 27. The touch wiring 31 is configured such that the first wiring portions 39 are disposed between the pixel electrodes 24 and the source wirings 27. This configuration is preferable for equalizing the parasitic capacitance between the pixel electrode 24 and one of the source wirings 27 and the parasitic capacitance between the pixel electrode 24 and the other one of the source wirings 27 to each other. By supplying the signals with the inverted polarities to the source wirings 27, the variation in potential of the pixel electrode 24 according to the variation in potential of one of the source wirings 27 and the variation in potential of the pixel electrode 24 according to the variation in potential of the other one of the source wirings 27 are compensated because of the parasitic capacitances that are about equal to each other. Namely, the variations in potential of the pixel electrode 24 can be reduced. Therefore, the reduction in display quality such as the shadowing is less likely to occur.

The touch wirings 31 are disposed in the layer in which at least the portions of the TFTs 23 are disposed. In comparison to the configuration in which the touch wirings 31 are disposed in a layer different from the layer in which at least the portion of the TFTs 23 are disposed and separated by an insulating film, the number of layers can be reduced. The configuration of this embodiment can contribute to a reduction of the production cost. In the configuration in which the TFTs 23 are disposed in the layer in which the touch wirings 31 are disposed, the routing of the touch wirings 31 may be difficult depending on the arrangement of the TFTs 23 or wire resistances of the touch wirings 31 may increase because of increased in length due to diverting of the touch wirings 31 around the TFTs 23. In this embodiment, the bridging wirings 44 bridge the sections of the touch wirings 31 to each other. The bridging wirings 44 are disposed to cross the TFTs 23 and the interlayer insulating film 37 is disposed between the bridging wirings 44 and the TFTs 23. Therefore, the touch wirings 31 can be routed or the wire resistances of the touch wirings 31 are reduced while short-circuits between the TFTs 23 and the touch wirings 31 are reduced. The sections of the bridging wirings 44 are connected to the second wiring portion non-connected ends 39A that are not connected to the second wiring portions 40 through the contact holes 45 in the interlayer insulating film 37. With the touch wirings 31 with the reduced wire resistances, the accuracy in detection of positions of input by the finger, which is a position input member, improves. Furthermore, the variations in potential upon switching between the supply of the touch signals and the supply of the common signals from the touch wirings 31 are less likely to be produced. Therefore, a decrease in display quality is less likely to occur.

The conductive structural objects are the TFTs 23 (the switching components) connected to the source wirings 27 and the pixel electrodes 24. The first wiring portions 39 are adjacent to each other in the arrangement direction. The first wiring portions 39 include the second wiring portion non-connected ends 39A that are not connected to the second wiring portions 40. The pixel electrodes 24 are disposed between the second wiring portion non-connected ends 39A of the first wiring portions 39. The bridging wirings 44 are connected to the second wiring portion non-connected ends 39A of the first wiring portions 39. According to the configuration, when the TFTs 23 are driven, the signals transmitted through the source wirings 27 are supplied to the pixel electrodes 24 and the pixel electrodes 24 are charged to the predefined potentials. The bridging wirings 44 bridge the second wiring portion non-connected ends 39A of the first wiring portions 39 to each other. Although the TFTs 23 are disposed between the second wiring portion non-connected ends 39A, the bridging wirings 44 are disposed to cross the TFTs 23 via the interlayer insulating film 37. Therefore, the touch wirings 31 can be routed or the wire resistances of the touch wirings 31 can be reduced while short-circuits between the touch wirings 31 and the TFTs 23 are reduced.

The first wiring portions 39 are connected the first wiring portions 39 on the opposite side in the arrangement direction via the second wiring portions 40. The TFTs 23 and the bridging wirings 44 are disposed adjacent to sides of the first wiring portions on an opposite side from the second wiring portions 40 in the arrangement direction. The TFTs 23 adjacent to the sides of the first-side first wiring portions 39R on an opposite side from the second wiring portions 40 in the arrangement direction are connected to the pixel electrodes 24 disposed on the opposite side from the second wiring portions 40 in the arrangement direction and the first source wirings 27. The TFTs 23 adjacent to the sides of the second-side first wiring portions 39L on the opposite side from the second wiring portions 40 in the arrangement direction are connected to the pixel electrodes 24 on the second wiring portion 40 side in the arrangement direction and the second source wirings 27. The areas in which the second wiring portions 40 are disposed and the areas in which the TFTs 23 and the bridging wirings 44 are disposed are located in a zigzag manner. The second wiring portions 40 are disposed in the areas in which the TFTs 23 and the bridging wirings 44 are not disposed. According to the configuration, the wire resistances of the touch wirings 31 can be further reduced. Signals are supplied to the pixel electrodes 24 that are adjacent to each other in the arrangement direction from the first source wiring 27 and the second source wiring 27, respectively, when the TFTs 23 are driven and the pixel electrodes 24 are charged to the predefined potentials. The signals transmitted to the different source wirings 27 are supplied to the pixel electrodes 24 adjacent to each other in the arrangement direction. This is preferable for arranging pixels with polarities in the same manner as pixels in dot inverting driving to drive the pixels with lower power consumption.

The sections of the TFTs 23, which are the conductive structural objects, are disposed between the ends of the first wiring portions 39 on the same side in the arrangement direction. The touch wirings 31 include the third wiring portions 41 that bridge the ends of the first wiring portions 39 on the opposite side from the TFTs 23 to each other. Because the ends of the first wiring portions 39 of the touch wirings 31 on the opposite side from the TFTs 23 are connected via the third wiring portions 41, the wire resistance of the touch wirings 31 can be further reduced.

The liquid crystal display device 10 includes the gate wirings 26 (scanning wirings), the TFTs 23, and the common electrode 25. The gate wiring 26 extend to cross the source wiring 27 and the touch wiring 31 and through which the scan signals are transmitted. The TFTs 23 are connected to the gate wiring 26, the source wiring 27, and the pixel electrodes 24. The common electrode 25 is disposed to at least partially overlap the pixel electrodes 24 via the interlayer insulating film 37. The common electrode 25 is divided to form the touch electrodes 30. The common electrode 25 includes the void 25B that separates the touch electrodes 30 from one another. The third wiring portions 41 are parallel to the gate wiring 26 and disposed to overlap the sections of the void 25B. According to the configuration, when the TFTs 23 are driven according to the scan signals transmitted through the gate wiring 26, the signals transmitted through the source wiring 27 are supplied to the pixel electrodes 24 and the pixel electrodes 24 are charged to the predefined potentials. Potential differences are created between the pixel electrodes 24 that are charged and the common electrode 25 that at least partially overlap the pixel electrodes 24 via the interlayer insulating film 37. The image display is performed using the potential differences. Because the touch electrodes 30 are provided by dividing the common electrode 25, this configuration is advantageous for reducing the production cost in comparison to a configuration in which the touch electrodes are disposed in a layer different from the layer in which the common electrode 25 is disposed. In the areas of the common electrode 25 around the void 25B, the electric fields between the gate wiring 26 close to the void 25B of the common electrode 25 may have adverse effects on the image display. In this embodiment, the third wiring portions 41 of the touch wiring 31 are parallel to the gate wiring 26 and disposed to overlap the sections of the void 25B. Therefore, the electric fields can be blocked and thus display defects are less likely to be produced around the void 25B.

The common electrode 25 is disposed to at least partially overlap the pixel electrodes 24 via the interlayer insulating film 37. The common electrode 25 is divided to form the touch electrodes 30. The touch electrodes 30 include the touch wiring overlapping openings 43 (the position detection wiring overlapping openings) arranged to selectively overlap the first wiring portions 39 of the touch wiring 31. According to the configuration, the potential difference are produced between the pixel electrodes 24 and the common electrode 25 that at least partially overlaps the pixel electrodes 24 via the interlayer insulating film 37 according to the signals transmitted through the source wiring 27 and supplied to the pixel electrodes 24. The image display is performed using the potential differences. With the touch wiring overlapping openings 43, the parasitic capacitances between the touch wiring 31 and the touch electrodes 30 that are not connected to the touch wiring 31 are reduced. Therefore, preferable sensitivity can be achieved for the position detection. The touch wiring overlapping openings 43 are arranged to selectively overlap the first wiring portions 39 of the touch wiring 31 and not to overlap the third wiring portions 41. In comparison to the configuration in which the touch wiring overlapping openings are formed in areas that overlap the first wiring portions 39 and the third wiring portions 41, the electric resistances of the touch electrodes 30 and the common electrode 25 can be reduced.

The bridging wiring 44 are disposed in the layer in which the touch electrodes 30 are disposed. The interlayer insulating film 37 includes the touch contact holes 42 (the position detection contact holes) for connecting the touch wiring 31 to the touch electrodes 30. According to the configuration, the bridging wiring 44 and the touch electrodes 30 are both connected to the touch wiring 31. The bridging wiring 44 and the touch electrodes 30 are connected to the touch wiring 31 through the contact holes 45 and the touch contact holes 42 formed in the interlayer insulating film 37. This configuration is preferable for reducing the production cost. The source wiring and the touch wiring 31 are disposed in the layer in which the pixel electrodes 24 are disposed. In comparison to a configuration in which the pixel electrodes are disposed in a layer different from the layer in which the source wiring 27 and the touch wiring 31 are disposed and separated by an insulating film, parasitic capacitance between the pixel electrodes 24 and the source wiring 27 are greater. Therefore, whether the touch wiring 31 are disposed therebetween is more likely to be a matter and the display quality is more likely to decrease. In this embodiment, the first wiring portions 39 of the touch wiring 31 are sandwiched between the source wiring 27 and the pixel electrodes 24 to equalize the parasitic capacitances. Therefore, the decrease in the display quality is less likely to occur. Furthermore, this configuration is preferable for further reducing the production cost.

Second Embodiment

A second embodiment will be described with reference to FIGS. 8 and 9. The second embodiment further includes a second transparent electrode film 138 having a configuration different from that of the first embodiment. Configurations, functions, and effects similar to those of the first embodiment will not be described.

Figure 8:
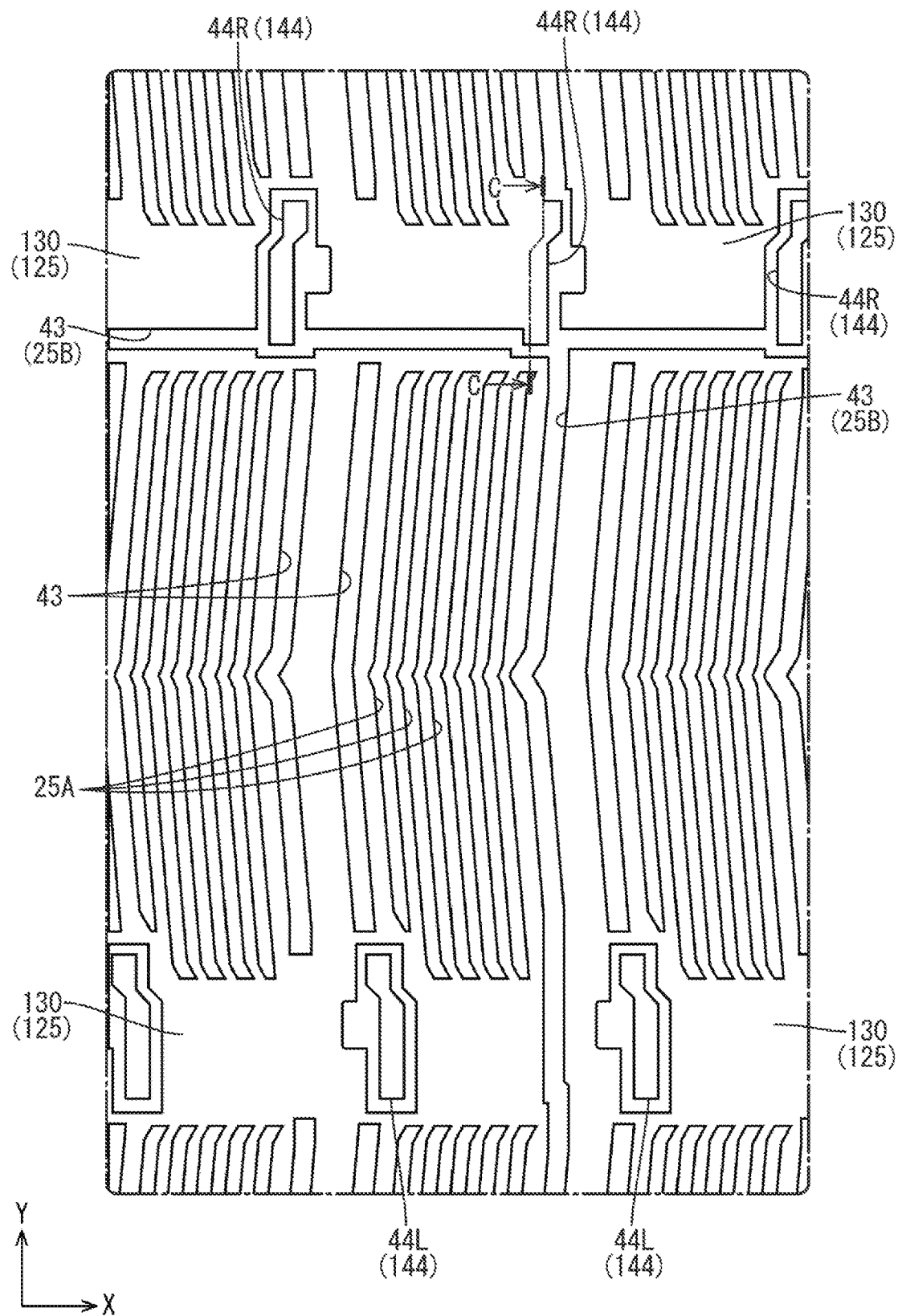
FIG. 8 is a plan view illustrating a second transparent electrode pattern on an array substrate included in a liquid crystal panel according to a second embodiment.
Figure 9:
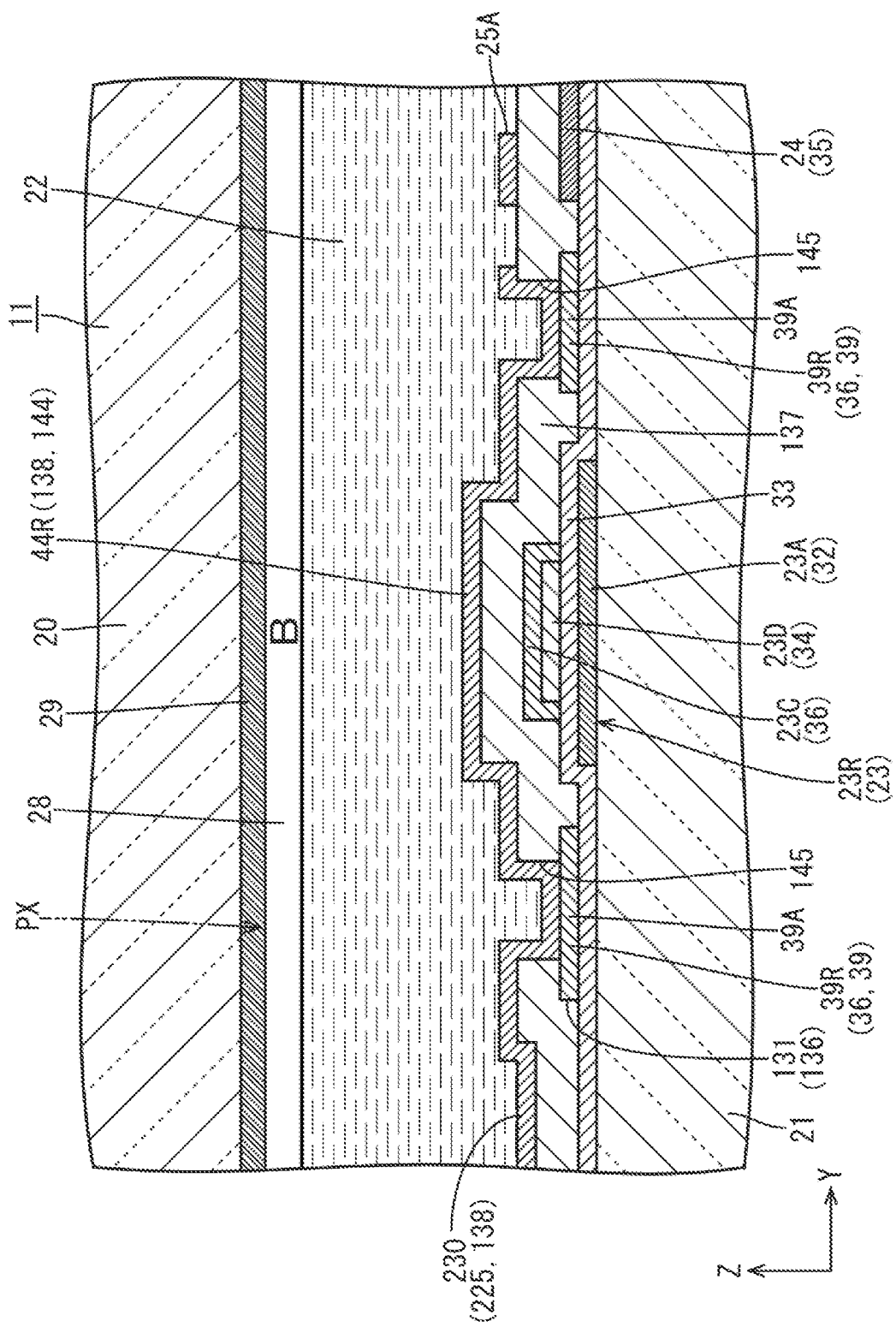
FIG. 9 is a cross-sectional view along line C-C in FIG. 8.

As illustrated in FIGS. 8 and 9, the second transparent electrode film 138 in this embodiment forms bridging wiring 144 that include sections integrated with a common electrode 125 and touch electrodes 130. The bridging wiring 144 integrated with the common electrode 125 and the touch electrodes 130 connect touch wiring 131 to the touch electrodes 130 through contact holes 145 formed in an interlayer insulating film 137. Namely, the contact holes 145 in the interlayer insulating film 137 overlapping the bridging wiring 144 integrated with the common electrode 125 and the touch electrodes 130 function as touch contact holes.

Third Embodiment

A third embodiment will be described with reference to FIGS. 10 to 12. The third embodiment includes bridging wiring 244, arrangement and connected components of which are different from the first embodiment. Configurations, functions, and effects similar to those of the first embodiment will not be described.

Figure 10:
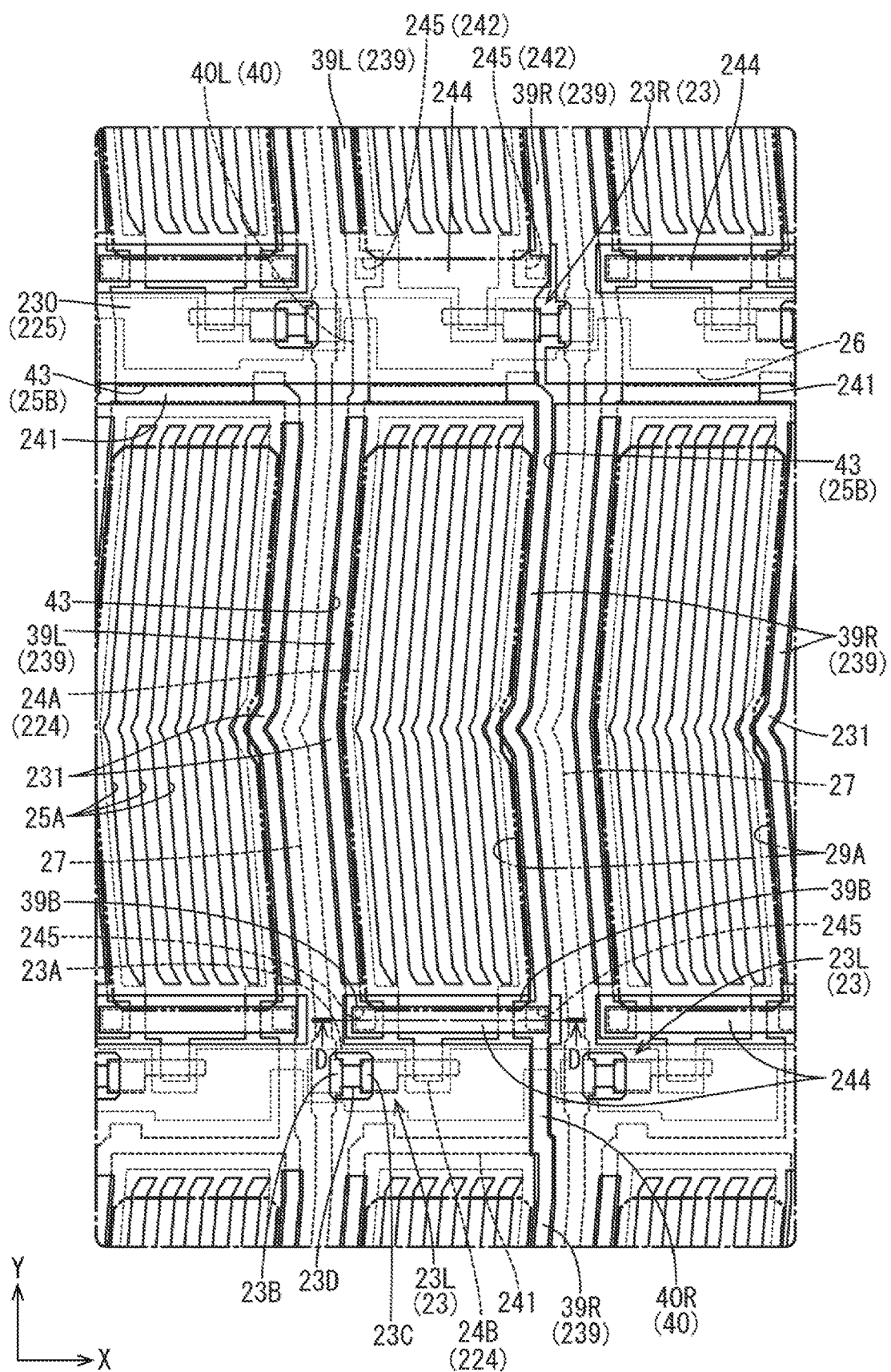
FIG. 10 is a plan view illustrating arrangements of pixels on an array substrate and a CF substrate included in a liquid crystal panel according to a third embodiment.
Figure 11:
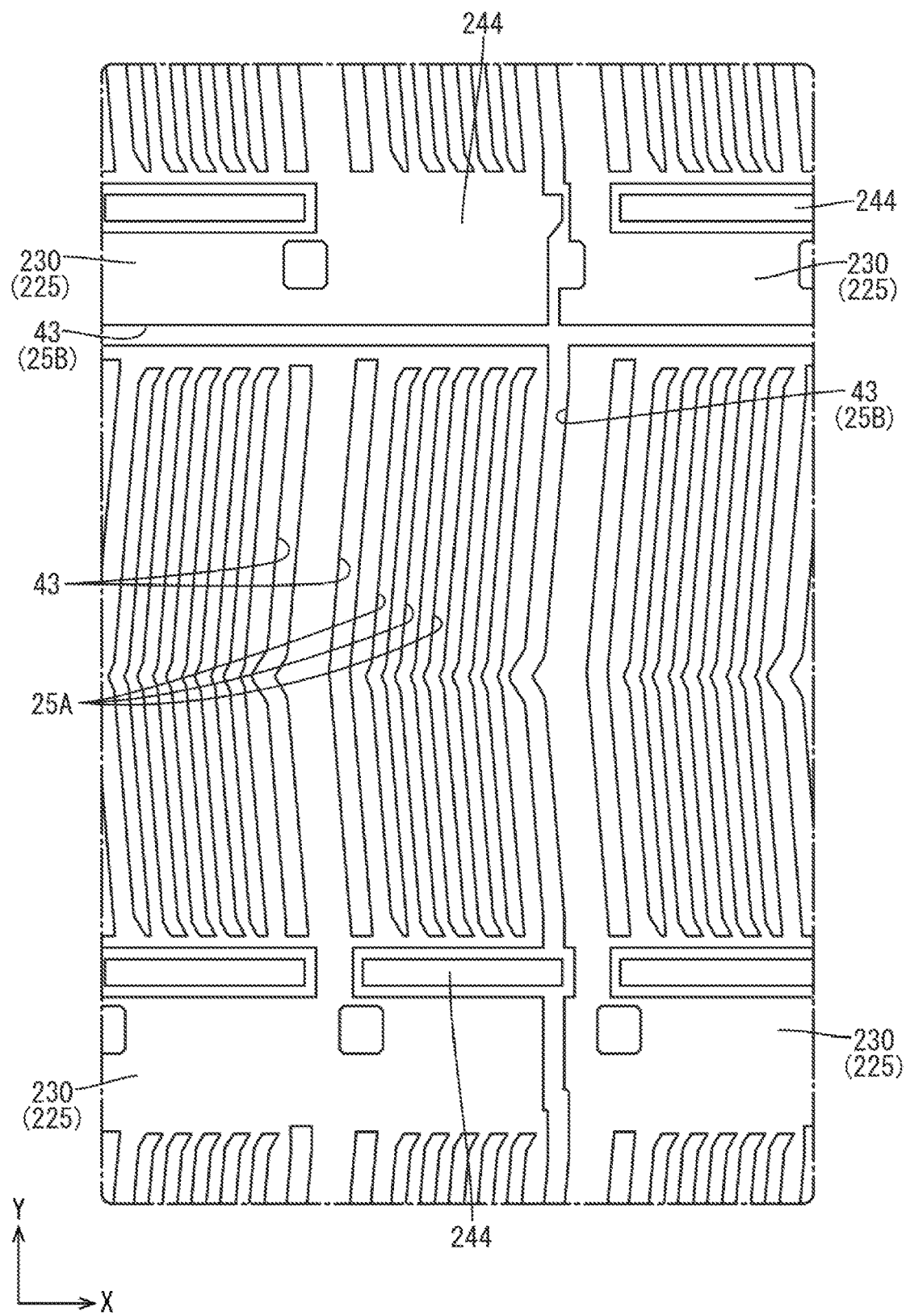
FIG. 11 is a plan view illustrating a second transparent electrode pattern on the array substrate included in the liquid crystal panel.
Figure 12:
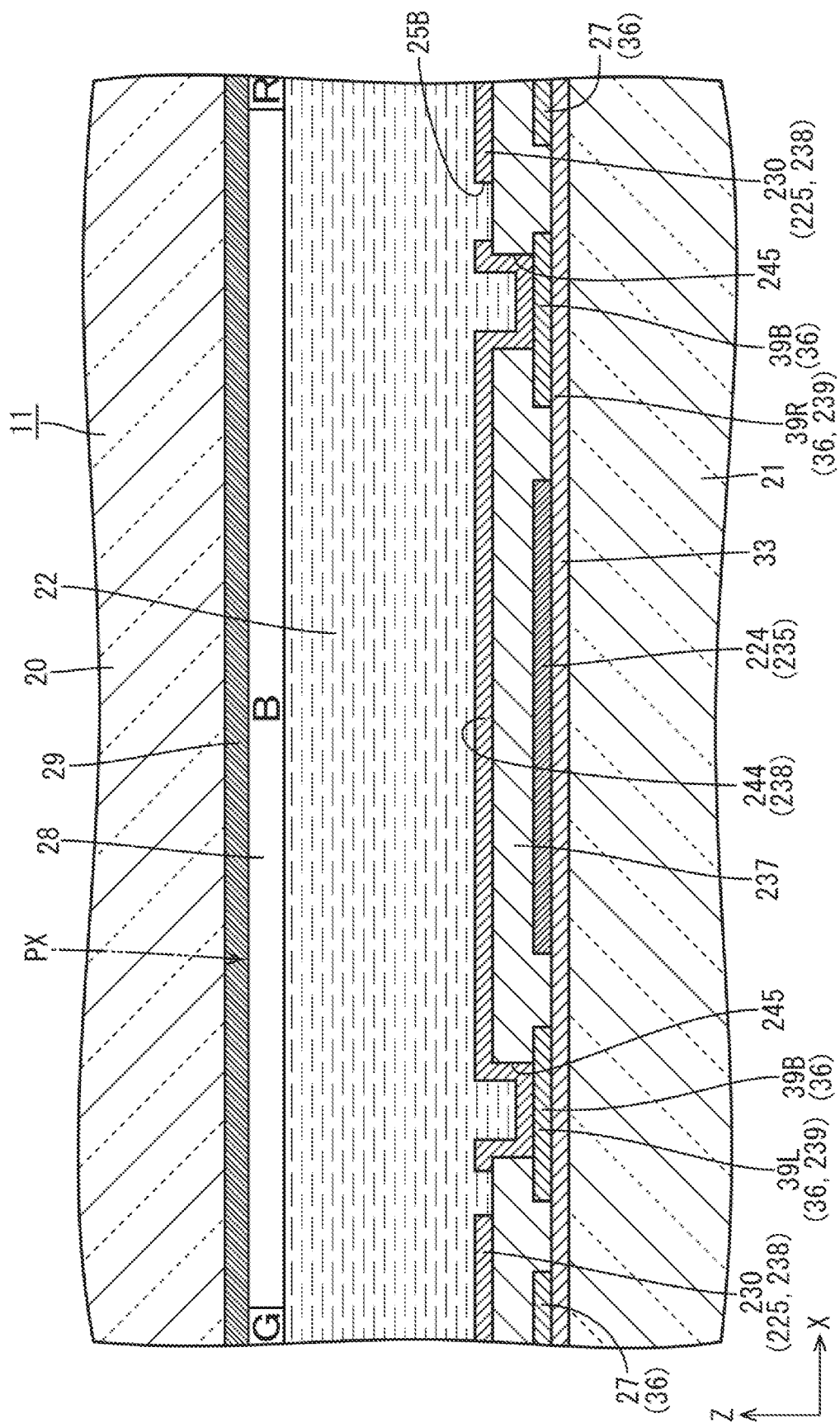
FIG. 12 is a cross-sectional view along line D-D in FIG. 10.

As illustrated in FIGS. 10 to 12, the bridging wiring 244 (pixel electrode bridging wirings) in this embodiment are disposed to cross pixel electrodes 224 and connected to touch wiring 231. An interlayer insulating film 237 is disposed between the bridging wiring 244 and the pixel electrodes 224. The bridging wiring 244 are constructed from the second transparent electrode film 238 from which common electrode 225 and touch electrodes 230 are constructed. The bridging wiring 244 are formed into an island shape by forming annular slits in the second transparent electrode film 238 and physically separating the bridging wiring 244 from the common electrode 225 and the touch electrodes 230. The bridging wiring 244 linearly extend in the X-axis direction. Middle sections of the bridging wiring 244 in the middle of the long dimension of the bridging wiring 244 overlap the pixel electrodes 224. Ends of the bridging wiring 244 at ends of the long dimension of the bridging wiring 244 are configured as touch wiring 231. The ends of the bridging wiring 244 overlap first wiring portions 239 that sandwich the pixel electrodes 224 from sides with respect to the X-axis direction. Specifically, the ends of the bridging wiring 244 overlap third wiring portion non-connected ends 39B that are not connected to third wiring portions 241. The third wiring portion non-connected ends 39B are ends of the first wiring portions 239 on an opposite side from the third wiring portions 241 (on the lower side in FIG. 10). Furthermore, the ends (the sections) of bridging wiring 244 are connected to the third wiring portion non-connected ends 39B that are configured as the touch wiring 231 through contact holes 245. The sections of the bridging wiring 244 are connected to the first wiring portions 239 that sandwich the pixel electrodes 224 from the sides with respect to the X-axis direction through the contact holes 245 formed in the interlayer insulating wiring 237. According to the configuration, wire resistances of the touch wiring 231 can be reduced. In this embodiment, the pixel electrodes 224 to which the bridging wiring 244 are connected are constructed from a first transparent electrode film 235, that is, have a single-layer configuration. In comparison to the first embodiment in which the TFTs 23 to which the bridging wiring 44 are connected have the multilayer configuration including a first metal film 32, the semiconductor film 34, and the second metal film 36 (see FIG. 7), the bridging wiring 244 have higher flatness and thus the bridging wiring 244 are less likely to break.

As illustrated in FIGS. 10 and 11, the bridging wiring 244 are constructed from the second transparent electrode film 238 and disposed in the layer in which the touch electrodes 230 are disposed. The interlayer insulating film 237 includes touch contact holes 242 (position detection contact holes) in addition to the contact holes 245 described earlier. The touch contact holes 242 are for connecting the touch wiring 231 to the touch electrodes 230. The bridging wiring 244 and the touch electrodes 230 are connected to the touch wiring 231. The contact holes 245 and the touch contact holes 242 are formed in the interlayer insulating film 237 to connect the bridging wiring 244 and the touch electrodes 230 to the touch wiring 231. This configuration is preferable for reducing the production cost.

As illustrated in FIG. 11, the second transparent electrode film 238 according to this embodiment includes bridging wiring 244, some of which are integrated with a common electrode 225 and touch electrodes 230. The bridging wiring 244 integrated with the common electrode 225 and the touch electrodes 230 connect the touch wiring 231 to the target touch electrodes 230 through the contact holes 245 formed in an interlayer insulating film 237. Namely, the contact holes 245 in the interlayer insulating film 237 overlapping the bridging wiring 244 integrated with the common electrode 225 and the touch electrode 230 also function as touch contact holes 242.

As described above, this embodiment includes the pixel electrodes 224 and the bridging wiring 244. At least the sections of the pixel electrodes 224 are disposed in the layer in which the touch wiring 231 are disposed. The bridging wiring 244 are disposed to cross the pixel electrodes 224 that are the conductive structural objects. The interlayer insulating film 237 is disposed between the bridging wiring 244 and the pixel electrodes 224. The sections of the bridging wiring 244 are connected to the ends of the first wiring portions 239 on the same side with respect to the arrangement direction of the first wiring portions 239 through the contact holes 245 in the interlayer insulating film 237. Because the touch wiring 231 are disposed in the layer in which at least the portions of the pixel electrodes 224 are disposed, the number of layers can be reduced in comparison to a configuration in which they are disposed in different layers that are separated by an insulating layer. This configuration can contribute to a reduction of the production cost. According to the configuration in which the pixel electrodes 224 are disposed in the layer in which the touch wiring 231 are disposed, routing of the touch wiring 231 may be difficult depending on the arrangement of the pixel electrodes 224 or wire resistances of the touch wiring 231 may increase because of increases in length due to diverting of the touch wiring 231 around the pixel electrodes 224. In this embodiment, the bridging wiring 244 bridge the sections of the touch wiring 231 to each other. The bridging wiring 244 are disposed to cross the pixel electrodes 224 and the insulating film 237 is disposed between the bridging wiring 244 and the pixel electrodes 224. Therefore, the touch wiring 231 can be routed or the wire resistances of the touch wiring 231 are reduced while short-circuits between the pixel electrodes 224 and the touch wiring 231 are reduced. The sections of the bridging wiring 244 are connected to the ends of the first wiring portions 239 on the same side with respect to the arrangement direction of the first wiring portions 239 through the contact holes 245 in the interlayer insulating film 237.

The pixel electrodes 224 are the conductive structural objects. The sections of the pixel electrodes 224 are disposed between the third wiring portion non-connected ends 39B on the same side with respect to the first wiring portions 239. The bridging wiring 244 are connected to the third wiring portion non-connected ends 39B on the same side with respect to the first wiring portions 239. Although the sections of the pixel electrodes 224 are disposed between the third wiring portion non-connected ends 39B on the same side with respect to the arrangement direction of the first wiring portions 239, the bridging wiring 244 are disposed to cross the pixel electrodes 224 via the interlayer insulating film 237. The bridging wiring 244 bridge the third wiring portion non-connected ends 39B on the same side with respect to the arrangement direction of the first wiring portions 239. According to the configuration, the touch wiring 231 can be routed or the wire resistance of the touch wiring 231 can be reduced while short-circuits between the touch wiring 231 and the pixel electrodes 224 are reduced.

Fourth Embodiment

A fourth embodiment will be described with reference to FIGS. 13 and 14. The fourth embodiment includes touch wiring 331 having a configuration different from that of the second embodiment. Configurations, functions, and effects similar to those of the second embodiment will not be described.

Figure 13:
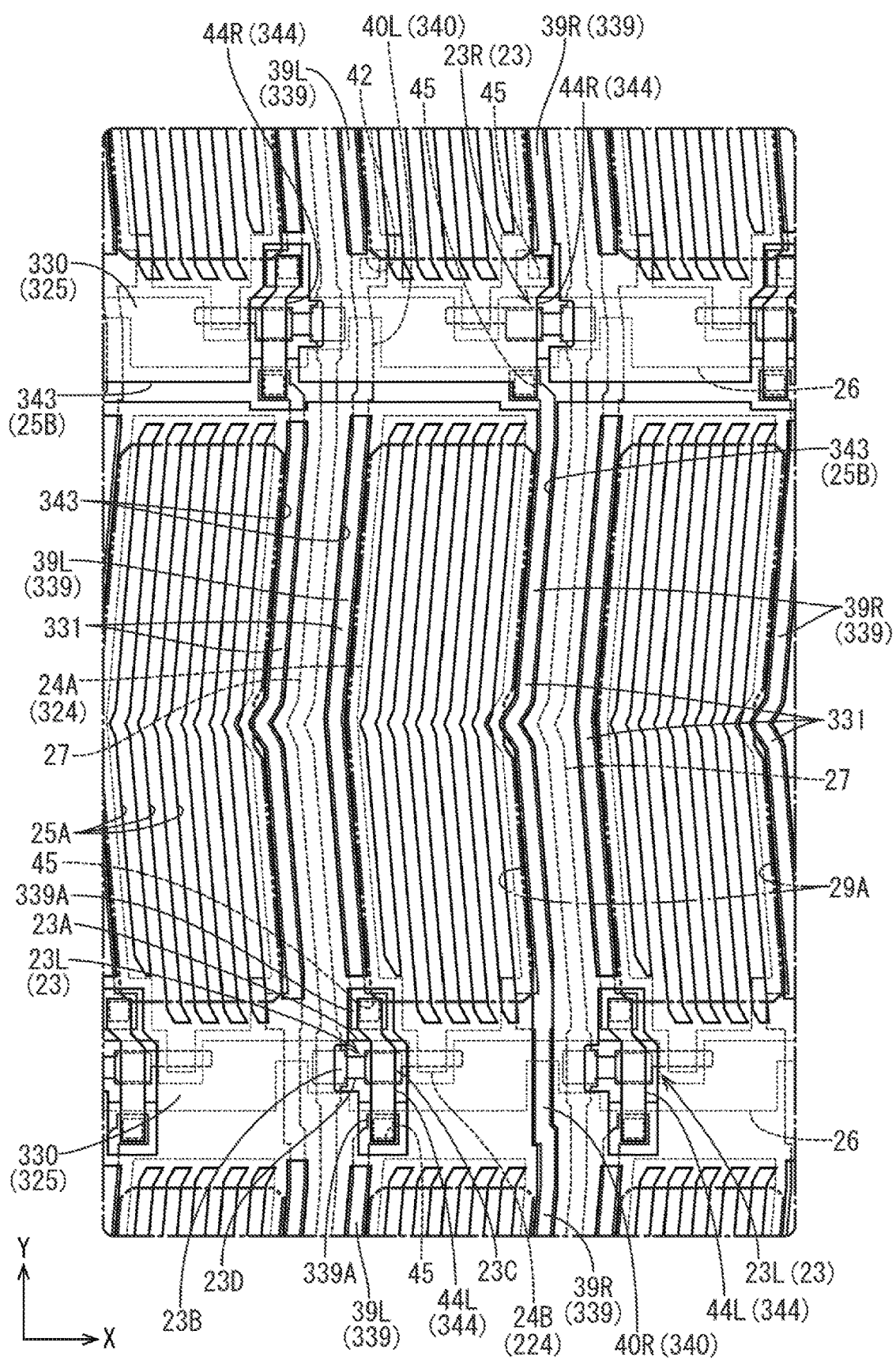
FIG. 13 is a plan view illustrating arrangements of pixels on an array substrate and a CF substrate included in a liquid crystal panel according to a fourth embodiment.
Figure 14:
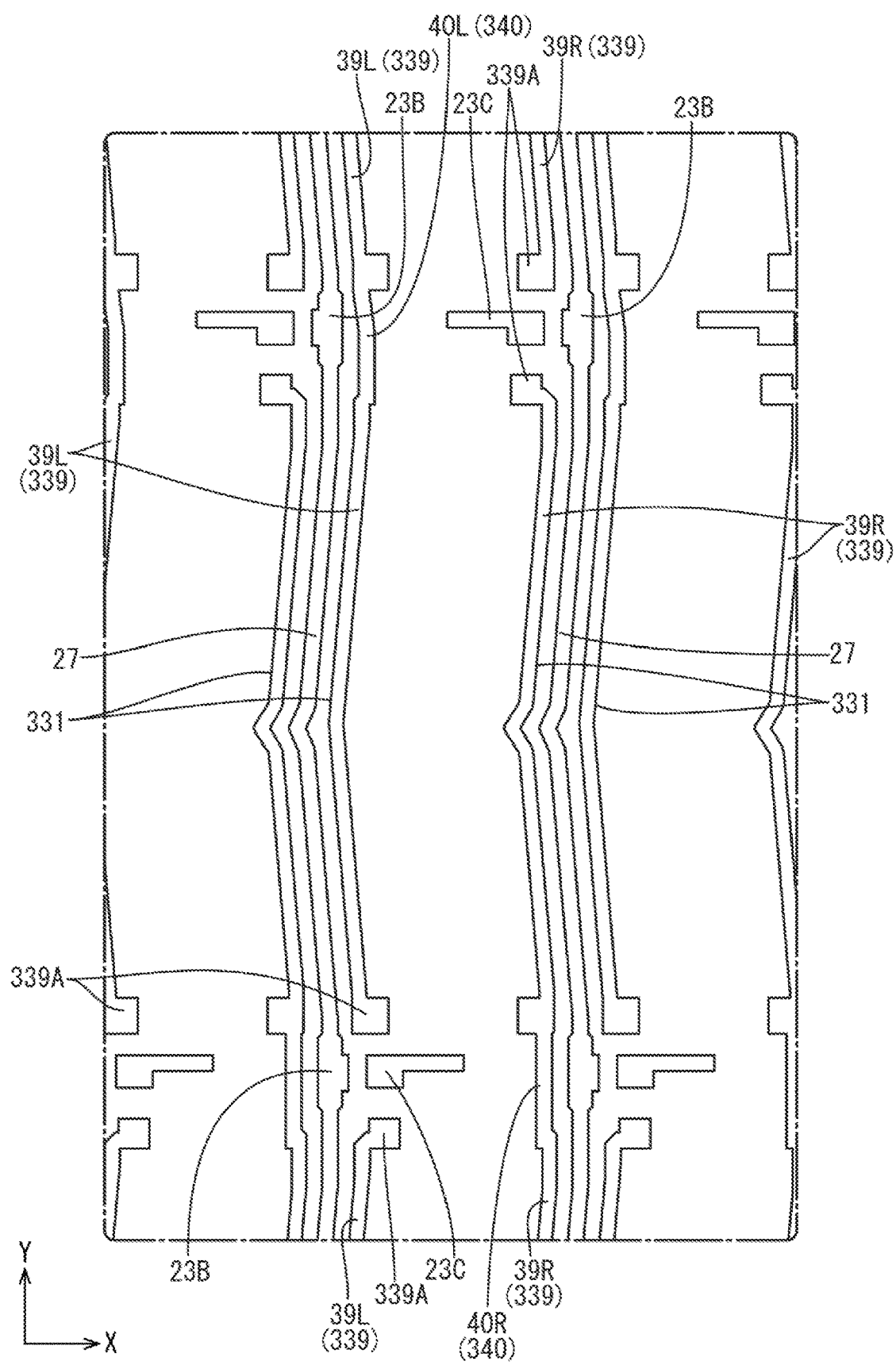
FIG. 14 is a plan view illustrating a second metal film pattern on the array substrate included in the liquid crystal panel.

As illustrated in FIGS. 13 and 14, the touch wiring 331 in this embodiment do not include the third wiring portions 41 that are included in the first embodiment. First wiring portions 339 that sandwich pixel electrodes 324 from the sides with respect to the X-axis direction are not electrically connected to each other (except for the portions at which the touch wiring 331 and touch electrodes 330 are connected). The first wiring portions 339 form the touch wiring 331 that are electrically independent from each other. The touch wiring 331 include the first wiring portions 339, second wiring portions 340, and bridging wiring 344. The first wiring portions 339 are arranged in the Y-axis direction. The second wiring portions 340 connect the first wiring portions 339 hat are adjacent to each other in the Y-axis direction. The bridging wiring 344 bridge second wiring portion non-connected ends 339A. The touch wiring 331 have surface areas less than surface areas of the touch wiring 31 in the first embodiment because the touch wiring 331 do not include the third wiring portions 31. A ratio of a total area of touch wiring overlapping openings 343 in common electrode 325 and the touch electrodes 330 arranged to overlap the first wiring portions 339 relative to the surface areas of the touch wiring 331 is greater. According to the configuration, parasitic capacitances that may appear between the touch wiring 331 and the touch electrodes 330 that are not connected to the touch wiring 331 can be efficiently reduced and thus higher sensitivity can be achieved in the position detection. In the configuration of the first embodiment (see FIGS. 2 and 4), to set a ratio of the total area of the touch wiring overlapping openings 43 relative to the surface areas of the touch wiring 31 equal to the ratio in this embodiment, the touch wiring overlapping openings may be formed in areas that cross boundaries between the first wiring portions and the second wiring portions. However, areas of the touch wiring overlapping openings may be excessively large and arrangement efficiency relative to the pixel overlapping openings 25A may be reduced, resulting in an increase in the electric resistance. In this embodiment, an excessive increase in the electric resistance of the common electrode 325 is less likely to occur. Therefore, proper levels of the display quality and the sensitivity in position detection can be achieved.

Fifth Embodiment

A fifth embodiment will be described with reference to FIGS. 15 and 16. The fifth embodiment includes touch wiring 431 having a configuration different from that of the fourth embodiment. Configurations, functions, and effects similar to those of the fourth embodiment will not be described.

Figure 15:
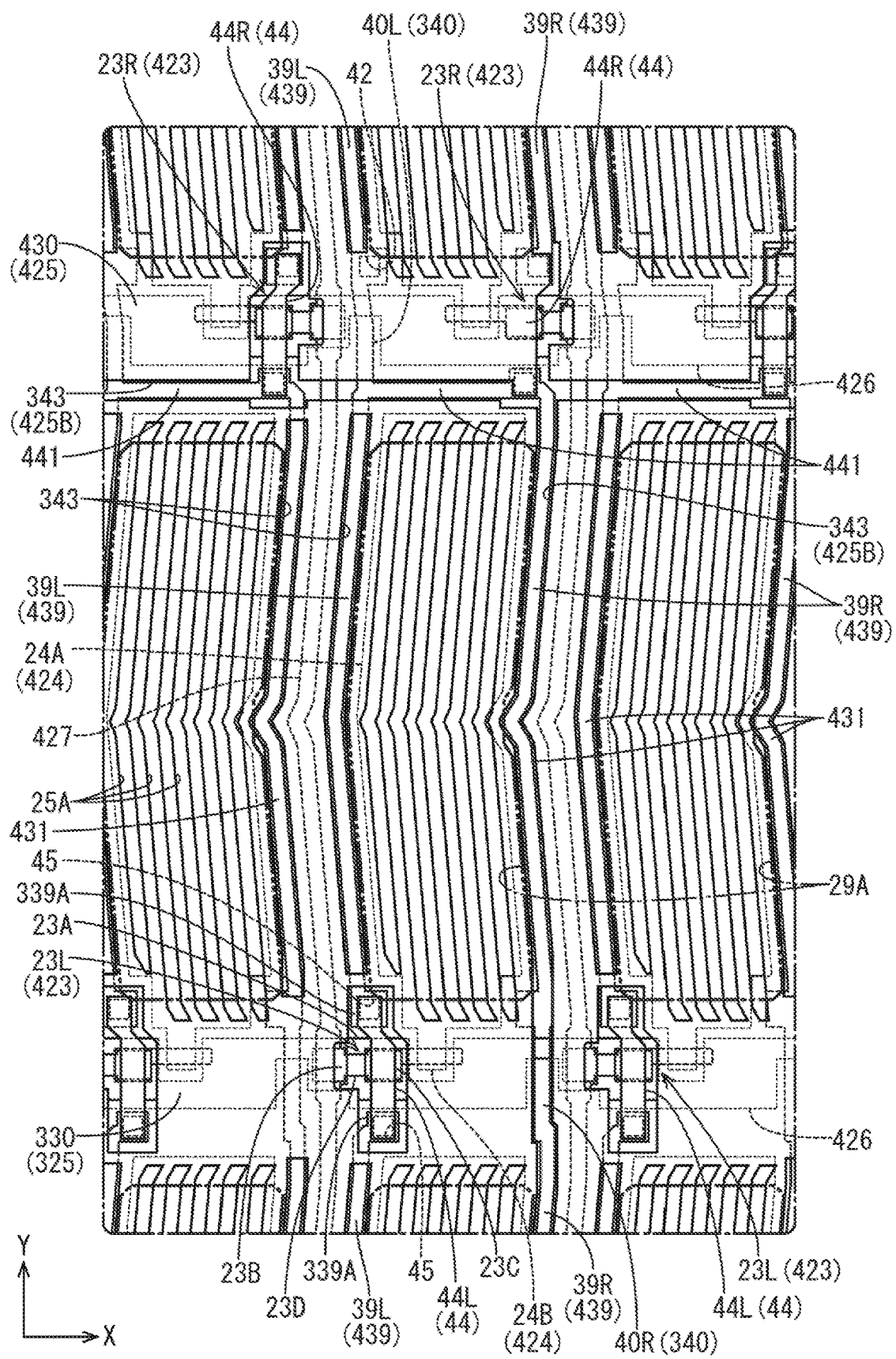
FIG. 15 is a plan view illustrating arrangements of pixels on an array substrate and a CF substrate included in a liquid crystal panel according to a fifth embodiment.
Figure 16:
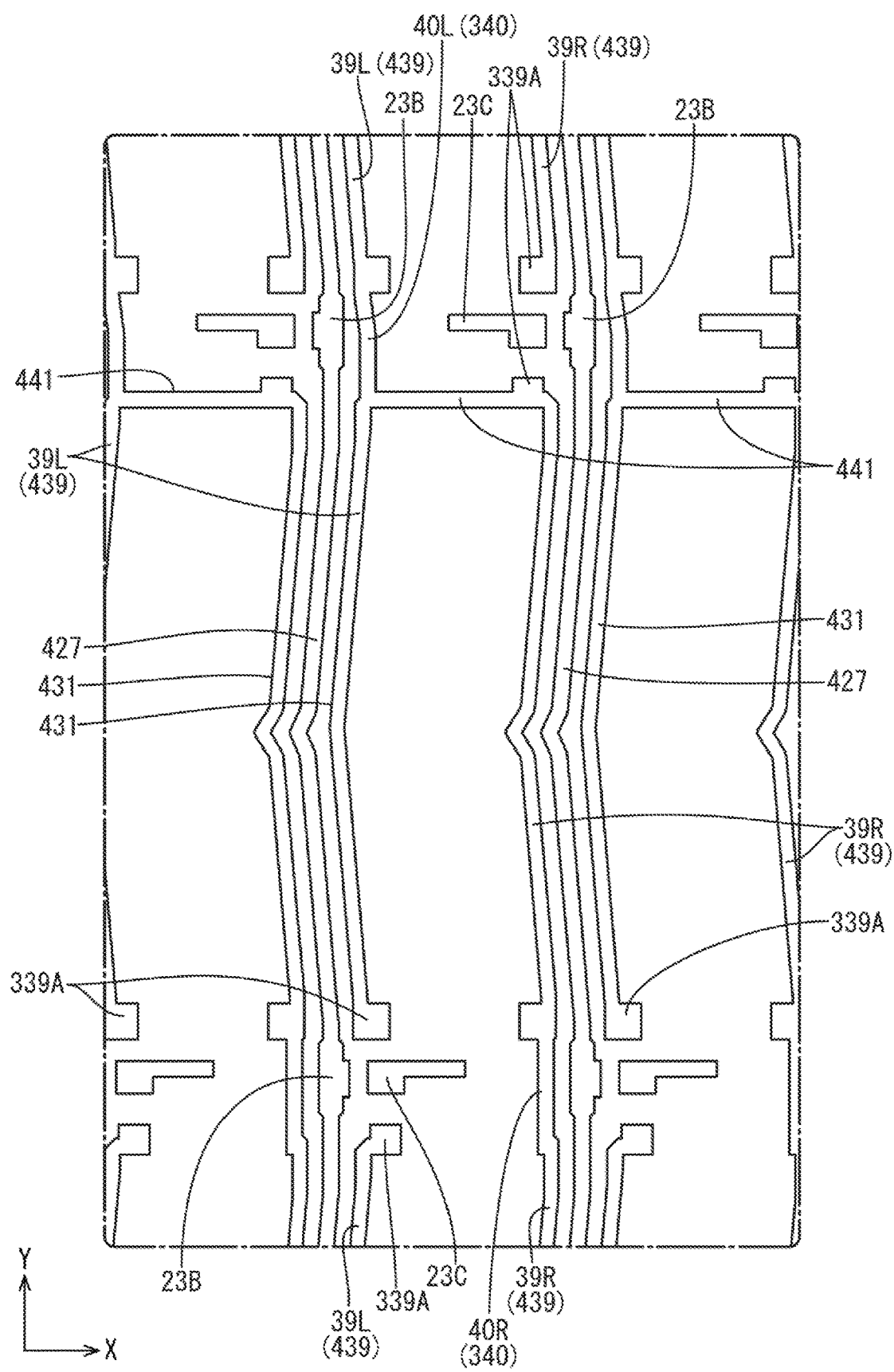
FIG. 16 is a plan view illustrating a second metal film pattern on the array substrate included in the liquid crystal panel.

As illustrated in FIGS. 15 and 16, the touch wiring 431 in this embodiment includes third wiring portions 441 are provided at specified positions for connecting first wiring portions 439 to each other. Specifically, the third wiring portions 441 are selectively disposed at positions overlapping sections of a void 425B extending in the X-axis direction but not at positions not overlapping the void 425B. The void 425B is for dividing a common electrode 425 into touch electrodes 430. In areas of the common electrode 425 around the void 425B, electric fields between gate wiring 426 and pixel electrodes 424 around the void 425B may have adverse effects on image display. In this embodiment, the third wiring portions 441 of the touch wiring 431 are disposed to overlap the sections of the void 425B. Therefore, the electric fields can be blocked and the display defects are less likely to be produced around the void 425B.

As described above, in this embodiment, the third wiring portions 441 are disposed parallel to the gate wiring 426 and to overlap the sections of the void 425B. When TFTs 423 are turned on according to scan signals transmitted through the gate wiring 426, signals transmitted through source wiring 427 are supplied to the pixel electrodes 424 and the pixel electrodes 424 are charged to predefined potentials. Potential differences may be produced between the pixel electrodes 424 that are charged and the common electrode 425 that at least partially overlap the pixel electrodes 424 via an interlayer insulating film. The image display is performed using the potential differences. The touch electrodes 430 are provided by dividing the common electrode 425. In comparison to a configuration in which the touch electrodes are disposed in a layer different from the layer in which the common electrode 425 is disposed, this configuration is preferable for reducing the production cost. In the areas of the common electrode 425 around the void 425B, the electric fields between the gate wiring 426 and the pixel electrodes 424 disposed around the void 425B may have the adverse effects on the image display. In this embodiment, the third wiring portions 441 of the touch wiring 431 are disposed parallel to the gate wiring 426 and to overlap the sections of the void 425B. Therefore, the electric fields can be blocked and thus display defects are less likely to be produced in the areas around the void 425B.

Other Embodiments

The technology disclosed herein is not limited to the embodiments described above and with reference to the drawings. The following embodiments may be included in the technical scope.

(1) In each of the above embodiments, the source wiring and the touch wiring are made of the same material. However, the source wiring and the touch wiring may be disposed in the same layer but made of different materials.

(2) In each of the above embodiments, the source wiring and the touch wiring are disposed in the same layer. However, the source wiring and the touch wiring may be disposed in different layers. In such a configuration, the third metal film may be disposed over the second metal film with an insulating film between the third metal film and the second metal film. Furthermore, the source wiring may be constructed from the second metal film and the touch wiring may be constructed from the third metal film.

(3) In each of the above embodiments, the source wiring, the touch wiring, and the pixel electrodes are disposed in the same layer. However, the pixel electrodes may be disposed in a layer different from a layer in which the source wiring and the touch wiring are disposed. For example, the insulating layer may be disposed on the second metal film and the first transparent electrode film may be disposed over the insulating film. The source wiring and the touch wiring may be constructed from the second metal film and the pixel electrodes may be constructed from the first transparent film. Alternatively, the source wiring, the touch wiring, and the pixel electrodes may be disposed in different layers, respectively.

(4) In each of the above embodiments, the touch wiring are provided for lines of the pixel electrodes, respectively. The lines of the pixel electrodes are arranged in the X-axis direction. However, the touch wiring may be selectively provided for specified pixel electrodes in the lines of the pixel electrodes. For example, the touch wiring may be provided only for the pixel electrodes that form blue pixel portions overlapping the blue color filters. The touch wiring may be provided for other pixel electrodes. The arrangement of the touch wiring can be altered where appropriate.

(5) In each of the above embodiments, the first TFTs and the second TFTs are disposed closer to the first ends of the pixel electrodes and the second ends of the pixel electrodes, respectively. The first TFTs and the second TFTs are disposed in the zigzag manner. The TFTs adjacent in the Y-axis direction may be linearly arranged in the Y-axis direction. In such a configuration, the TFTs may be disposed closer to the first ends or the second ends of the pixel electrodes with respect to the X-axis direction or may not be closer to the first ends or the second ends of the pixel electrodes.

(6) The configuration of the above embodiment (5) may be applied to the configuration of anyone of the first, the second, the fourth, and the fifth embodiments (the configuration in which the bridging wiring cross the TFTs). In this case, the bridging wiring may be connected to either the first-side first wiring portions disposed in the Y-axis direction or the second-side first wiring portions disposed in the Y-axis direction.

(7) In each of the first, the second, the fourth, and the fifth embodiments, the bridging wiring that cross the TFTs are constructed from the second transparent electrode film. However, an insulating film may be disposed on the second metal film that forms the source wiring and the touch wiring and the first transparent electrode film that forms the pixel electrodes may be disposed over the insulating film. In such a configuration, the bridging wiring that cross the TFTs may be formed form the first transparent electrode film.

(8) In the third embodiment, the bridging wiring that cross the pixel electrodes are constructed from the second transparent electrode film. However, an insulating film may be disposed on the second metal film that forms the source wiring and the touch wiring and the first transparent electrode film that forms the pixel electrodes may be disposed over the insulating film. In such a configuration, the bridging wiring that cross the pixel electrodes maybe constructed from the first metal film or the second metal film.

(9) The display device may include both the bridging wiring that cross the TFTs in each of the first, the second, the fourth, and the fifth embodiments and the bridging wiring that cross pixel electrode in the fourth embodiment.

(10) In each of the above embodiments, the TFTs are connected to the pixel electrodes located above the TFTs in FIG. 2. However, the TFTs may be connected to the pixel electrodes located below the TFTs in FIG. 2.

(11) The two-dimensional arrangement of the contact holes may be altered from those in the above embodiments where appropriate.

(12) The technical matters in the above embodiments may be combined where appropriate.

(13) In each of the above embodiments, the light blocking portion is provided on the CF substrate. However, the light blocking portion may be provided on the array substrate.

(14) The semiconductor film that forms the channels of the TFTs may be made of polysilicon. In such a configuration, it is preferable that bottom-gate type TFTs are used.

(15) In each of the above embodiments, the touchscreen pattern uses the self-capacitance method. However, a touch screen pattern that uses a mutual-capacitance method may be used.

(16) The transmissive liquid crystal panel is described in each of the above embodiment sections. However, the technology described herein maybe applied to reflective liquid crystal panels and semitransmissive liquid crystal panels.

(17) The liquid crystal display device having the horizontally-long rectangular shape in the plan view is described in each of the above embodiment sections. However, the technology described herein may be applied to liquid crystal display devices having vertically-long rectangular shapes, square shapes, circular shapes, semicircular shapes, oval shapes, and trapezoidal shapes.

(18) The liquid crystal panel including the liquid crystal layer sandwiched between the substrate is described in each of the above embodiments. However, the technology described herein may be applied to display panels each including functional organic molecules other than the liquid crystals sandwiched between the substrates.

(19) The sequence of the layers of the drain electrodes of the TFTs and the pixel electrodes on the gate insulating film is not limited to that of the above embodiments. The drain electrodes of the TFTs may be disposed above the pixel electrodes or the pixel electrodes may be disposed above the drain electrodes.

The invention claimed is:

1. A display device with a position inputting function comprising:
    pixel electrodes linearly disposed;
    signal wirings configured to transmit signals supplied to the pixel electrode and disposed to sandwich the pixel electrodes;
    position detection electrodes each configured to form capacitors between the position detection electrodes and a position input member and to detect a position of input by the position input member;
    a position detection wiring connected to the position detection electrodes comprising at least:
        first wiring portions each sandwiched between the pixel electrodes and the signal wirings, wherein pairs of the first wiring portions are linearly disposed in an arrangement direction in which the pixel electrodes are disposed; and
        second wiring portions connecting ends of the first wiring portions adjacent to each other in the arrangement direction;
    conductive structural objects, at least sections of which are disposed in a layer in which the position detection wiring is disposed;
    bridging wirings disposed to cross the conductive structural objects and including sections connected to ends of the first wiring portions adjacent to each other in the arrangement direction or ends of the first wiring portions on a same side with respect to the arrangement direction through contact holes, wherein the ends of the first line portions adjacent to each other in the arrangement direction are not connected to the second line portions; and
    an insulating film disposed between the conductive structural objects and the bridging wirings, wherein the insulating film includes the contact holes.

2. The display device according to claim 1, wherein
    the conductive structural objects are switching components connected to the signal wirings and the pixel electrodes and disposed between ends of the first wiring portions adjacent to each other in the arrangement direction, wherein the ends are not connected to the second wiring portions, and
    the bridging wirings are connected to the ends of the first wiring portions adjacent to each other in the arrangement direction, wherein the ends are not connected to the second wiring portions.

3. The display device according to claim 2, wherein
    the position detection wiring is connected to the first wiring portions adjacent to respective pairs of the first wiring portions in the arrangement direction on an opposite side from the respective pairs of the first wiring portions via the second wiring portions, the switching components and the bridging wirings are disposed adjacent to the first wiring portions on an opposite side from a second wiring portion side in the arrangement direction, the switching components adjacent to first-side first wiring portions disposed on a first side on the opposite side from the second wiring portion side are connected to the pixel electrodes disposed on the opposite side from the second wiring portion side in the arrangement direction and to one of the signal wirings, and the switching components adjacent to second-side first wiring portions disposed on a second side on the opposite side from the second wiring portions side are connected to the pixel electrodes disposed on the second wiring portion side in the arrangement direction and to another one of the signal wirings.

4. The display device according to claim 1, wherein the conductive structural objects are the pixel electrodes including sections disposed between ends of the first wiring portions on a same side in the arrangement direction, and the bridging wirings are connected to the ends of the first wiring portions on the same side in the arrangement direction.

5. The display device according to claim 1, wherein the conductive structural objects include sections disposed between ends of the first wiring portions on a same side in the arrangement direction, and the position detection wiring includes third wiring portions connecting ends of the first wiring portions on an opposite side from a conductive structural object side.

6. The display device according to claim 5, further comprising:

a scan wiring extending to cross the signal wirings and the position detection wiring and through which scan signals are transmitted;

switching components connected to the scan wiring, the signal wirings, and the pixel electrodes; and a common electrode disposed such that at least sections thereof overlap the pixel electrodes via an insulating film and including a void dividing the common electrode to form the position detection electrodes and separating the position detection electrodes from one another, wherein the third wiring portions are disposed parallel to the scan wiring and to overlap sections of the void.

7. The display device according to claim 5, further comprising a common electrode including sections to overlap the pixel electrodes via an insulating film and divided to form the position detection electrodes, wherein the position detection electrodes include position detection wiring overlapping openings selectively overlapping the first wiring portions of the position detection wiring.

8. The display device according to claim 1, wherein the bridging wirings are disposed in a layer in which the position detection electrodes are disposed, and the insulating film includes position detection contact holes for connecting the position detection wiring to the position detection electrodes.

9. The display device according to claim 1, wherein the signal wirings and the position detection wirings are disposed in a same layer.

10. The display device according to claim 9, wherein the signal wirings and the position detection wiring are disposed in a layer in which the pixel electrodes are disposed.

* * * * *